US012777540B2

(12) United States Patent
Yilmaz et al.

(10) Patent No.: US 12,777,540 B2
(45) Date of Patent: *Oct. 27, 2026

(54) HANDLING A SECONDARY CELL GROUP CONFIGURATION

(71) Applicant: Telefonaktiebolaget LM Ericsson (publ), Stockholm (SE)

(72) Inventors: Osman Nuri Can Yilmaz, Espoo (FI); Oumer Teyeb, Montréal (CA); Patrik Rugeland, Stockholm (SE); Lian Araujo, Solna (SE); Icaro L. J. Da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

This patent is subject to a terminal disclaimer.

(21) Appl. No.: 18/741,392

(22) Filed: Jun. 12, 2024

(65) Prior Publication Data

US 2024/0414795 A1 Dec. 12, 2024

Related U.S. Application Data

(63) Continuation of application No. 17/439,943, filed as application No. PCT/SE2020/050004 on Jan. 8, 2020, now Pat. No. 12,035,393.

(Continued)

(51) Int. Cl.

| | |
|---|---|
| ***H04W 76/15*** | (2018.01) |
| ***H04W 76/20*** | (2018.01) |
| *H04W 76/27* | (2018.01) |

(52) U.S. Cl.

CPC .......... *H04W 76/15* (2018.02); *H04W 76/20* (2018.02); *H04W 76/27* (2018.02)

(58) Field of Classification Search

CPC .............................. H04W 76/15; H04W 76/20

See application file for complete search history.

(56) References Cited

U.S. PATENT DOCUMENTS

| | | | | |
|---|---|---|---|---|
| 9,615,295 | B2 * | 4/2017 | Kim | H04W 36/00695 |
| 11,026,291 | B2 * | 6/2021 | Sharma | H04W 12/04 |

(Continued)

FOREIGN PATENT DOCUMENTS

| | | | |
|---|---|---|---|
| CN | 107006051 | A | 8/2017 |
| IN | 201737002809 | A | 5/2017 |

(Continued)

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.5.0, Mar. 2019, 1-948.

(Continued)

*Primary Examiner* — Michael J Moore, Jr.
(74) *Attorney, Agent, or Firm* — Murphy, Bilak & Homiller, PLLC

(57) ABSTRACT

A method performed by a User Equipment (UE) for handling a Secondary Cell Group (SCG) configuration in a wireless communications network is provided. The UE receives, from a network node, an SCG configuration and a trigger condition related to the signal quality of a cell associated with the SCG configuration. The UE then performs signal quality measurements of a cell associated with the SCG configuration. When the trigger condition of the cell is fulfilled according to the received SCG configuration, the UE applies the SCG configuration associated to the cell fulfilling the trigger condition.

20 Claims, 15 Drawing Sheets

Method in a UE

Related U.S. Application Data

(60) Provisional application No. 62/820,872, filed on Mar. 20, 2019.

(56) References Cited

U.S. PATENT DOCUMENTS

| | | | | |
|---|---|---|---|---|
| 11,743,244 | B2 * | 8/2023 | Van Der Velde | H04W 12/043<br>370/254 |
| 12,035,393 | B2 * | 7/2024 | Yilmaz | H04W 36/0088 |
| 2015/0215826 | A1 | 7/2015 | Yamada | |
| 2015/0271713 | A1 | 9/2015 | Kim et al. | |
| 2016/0338039 | A1 * | 11/2016 | Van Der Velde | H04W 76/15 |
| 2020/0260520 | A1 * | 8/2020 | Jin | H04L 5/001 |
| 2020/0275519 | A1 * | 8/2020 | Sharma | H04W 12/04 |
| 2020/0374961 | A1 * | 11/2020 | Ingale | H04W 76/20 |
| 2022/0183094 | A1 * | 6/2022 | Yilmaz | H04W 36/0088 |
| 2022/0295366 | A1 * | 9/2022 | Teyeb | H04W 36/0061 |
| 2023/0300691 | A1 * | 9/2023 | Eklöf | H04W 36/0061<br>370/331 |
| 2023/0363027 | A1 * | 11/2023 | Da Silva | H04W 76/20 |

FOREIGN PATENT DOCUMENTS

| | | | |
|---|---|---|---|
| RU | 2672623 | C2 | 11/2018 |
| WO | 2016021821 | A1 | 2/2016 |
| WO | 2018228451 | A1 | 12/2018 |
| WO | 2019031827 | A1 | 2/2019 |
| WO | 2020167169 | A1 | 8/2020 |
| WO | 2020190188 | A1 | 9/2020 |

OTHER PUBLICATIONS

3GPP , "3rd Generation Partnership Project; Technical Specification Group Radio Access Network; NR; Radio Resource Control (RRC) protocol specification (Release 15)", 3GPP TS 38.331 V15.5.0, Mar. 2019, 1-491.

Unknown, Author , "Conditional SN addition", 3GPP TSG-RAN WG2 Meeting #105, R2-1900213, Athens, Greece, Feb. 25-Mar. 1, 2019, 1-5.

Unknown, Author , "PDCP handling in case of PSCell change", Ericsson; 3GPP TSG-RAN WG2 #100, Tdoc R2-1713435, Reno, US, Nov. 27-Dec. 1, 2017, 1-4.

Unknown, Author , "Scenarios for handover robusness improvements in NR", 3GPP TSG-RAN WG2 #105, R2-1901004, Athens, Greece, Feb. 25-Mar. 1, 2019, 1-5.

* cited by examiner

Method in a UE

Method in a network node

HANDLING A SECONDARY CELL GROUP CONFIGURATION

TECHNICAL FIELD

Embodiments herein relate to a user Equipment (UE), a network node and methods therein. In particular, they relate to handling a Secondary Cell Group (SCG) configuration in a wireless communications network.

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In 3GPP Dual-Connectivity (DC) solution has been specified, both for LTE and NR, as well as between LTE and NR. In DC two nodes are involved, a Master Node (MN) and a Secondary Node (SN). Multi-Connectivity (MC) is a case when there are more than two nodes involved. DC may also be used in Ultra Reliable Low Latency Communications (URLLC) cases in order to enhance the robustness and to avoid connection interruptions.

Inter-RAT and Inter 5GC in Interworking LTE and NR 5G in 3GPP introduces both a new core network (5GC) and a New Radio access network (NR). The 5GC will however, also support other RATs than NR. It has been agreed that LTE, here also referred to as E-UTRA, also will be connected to 5GC. LTE base stations referred to as eNBs, that are connected to 5GC are referred to as new generation-eNB (ng-eNBs) and is part of NG-RAN which also comprises NR base stations called gNBs. FIG. 1 depicts a 5G System (5GS) architecture comprising 5GC and NG-RAN. It shows how the base stations are connected to each other and the nodes in 5GC. The interface between the base stations are referred to as Xn. The interface between the base stations and core network nodes such as Access and Mobility Function/User Plane Function (AMF/UPF) nodes and the core network are referred to as NG.

Currently in an LTE (E-UTRA) connected to the 5GC and NR state transitions are supported, see FIG. 2. FIG. 2 depicts UE state machine and state transitions between NR/5GC, E-UTRA/EPC and E-UTRA/5GC.

As can be seen it is possible to move an ongoing UE connection wherein the UE is in RRC_CONNECTED state, between the two RATs using handover procedure. Additionally (not shown) it is possible for the network to move the UE to the other Radio Access Technology (RAT) by sending a Release message with re-direct information. When the UE is in RRC-IDLE or RRC-INACTIVE state the cell reselection procedure will be used when transiting between the RATs. Within the RATs there is also an RRC Re-establishment procedure which may be triggered if the UE loses the radio connection, referred to as Radio Link Failure, or at intra or inter-RAT handover failure.

In NR and E-UTRA, i.e. LTE connected to 5GC, a new RRC state called RRC_INACTIVE has been introduced. When used herein, NG-RAN refers to either NR or LTE connected to 5G Core (5GC) network.

In RRC_INACTIVE, the UE stores certain configurations, e.g. Data Radio Bearer (DRB) configurations and physical layers parameters. When the UE need to resume the connection, it transmits an RRCConnectionResumeRequest or RRCResumeRequest message in LTE and NR respectively. The UE may then reuse the stored settings and reduce the time and signaling needed to enter RRC_CONNECTED.

LTE and NR/EPS and 5GS

There are different ways to deploy 5G network with or without interworking with LTE and EPC, which is referred to as different options. In principle, NR and LTE may be deployed without any interworking, denoted by NR Stand-Alone (SA) operation, that is gNB in NR may be connected to 5GC (Option 2) and eNB may be connected to EPC (Option 1) with no interconnection between the two.

On the other hand, the first supported version of NR is the so-called E-UTRAN-NR Dual Connectivity (EN-DC), (Option 3). In Option 3, a deployment, dual connectivity between NR and LTE is applied with LTE as a master node and NR as a secondary node. The RAN node (gNB) supporting NR, may not have a control plane connection to EPC, instead it relies on the LTE as Master node (MeNB). This is also referred to as Non-standalone NR. It should be noted that that in this case the functionality of an NR cell is limited and would be used for connected mode UEs as a booster and/or diversity leg, but an RRC_IDLE UE cannot camp on these NR cells.

With introduction of 5GC, other options may be also valid. As mentioned above, option 2 supports stand-alone NR deployment where gNB is connected to 5GC. Similarly, LTE may also be connected to 5GC using eLTE, E-UTRA/5GC, or LTE/5GC and the node may be referred to as an ng-eNB (Option 5). eLTE means that LTE is connected to 5GC. In these cases, both NR and LTE are seen as part of the NG-RAN (and both the ng-eNB and the gNB can be referred to as NG-RAN nodes).

It is worth noting that, Option 4 and Option 7 are other variants of dual connectivity between LTE and NR which will be standardized as part of NG-RAN connected to 5GC, denoted by MR-DC (Multi-Radio Dual Connectivity). The following is comprised under the MR-DC umbrella:

- EN-DC (Option 3): LTE is the master node and NR is the secondary (EPC CN employed)
- NE-DC (Option 4): NR is the master node and LTE is the secondary (5GCN employed)
- NGEN-DC (Option 7): LTE is the master node and NR is the secondary (5GCN employed)
- NR-DC (variant of Option 2): Dual connectivity where both the master and secondary are NR (5GCN employed).

As the migration for these options may differ from different operators, it is possible to have deployments with multiple options in parallel in the same network e.g. there may be an eNB base station supporting option 3, 5 and 7 in the same network as an NR base station supporting option 2 and 4. In combination with dual connectivity solutions between LTE and NR it is also possible to support Carrier Aggregation (CA) in each cell group, i.e. Master Cell Group (MCG) and Secondary Cell Group (SCG), and dual connectivity between nodes on same RAT, e.g. NR-NR DC. For the LTE cells, a consequence of these different deployments is the co-existence of LTE cells associated to eNBs connected to EPC, 5GC or both EPC/5GC.

Background RRC Connection Resume in LTE

In 3GPP LTE Release-13, a mechanism was introduced for the UE to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of as prior to establish the RRC connection from scratch. Reducing the signaling could have several benefits:

- Reduce latency e.g. for smart phones accessing Internet.
- Reduced signaling leads to reduce battery consumption for machine type devices sending very little data.

The Release-13 solution is based on that the UE sends an RRCConnectionResumeRequest message to the network and in response may receive an RRCConnectionResume message from the network. The RRCConnectionResume message is not encrypted but integrity protected.

The resume procedure in LTE may be found in the 3GPP RRC specifications TS 36.331. As the UE performing resume is in RRC_IDLE (with suspended AS context), that triggers a transition from RRC_IDLE to RRC_CONNECTED. Hence, that is modelled in the specifications in the same subclause that captures the RRC connection establishment (subclause 5.3.3 RRC connection establishment).

Background RRC Connection Resume in NR and eLTE

The RRC state model is updated in NR and in eLTE, i.e. LTE connected to 5GC, and a new RRC_INACTIVE state is introduced in addition to the existing RRC_IDLE and RRC_CONNECTED states inherited from LTE. In RRC_INACTIVE, the UE context from a previous RRC connection is stored in the RAN and is re-used the next time an RRC connection is established. The UE context includes information such as the UE security configuration, configured radio bearers etc. By storing the UE context in the RAN, the signaling required for security activation and bearer establishment is avoided, which is normally required when transitioning from RRC_IDLE to RRC_CONNECTED. This improves latency and reduces the signaling overhead.

A UE state machine and state transitions in NR is depicted in FIG. 3.

The NR RRC_INACTIVE mode is realized by introducing two new procedures RRC connection suspend also called RRC connection release with Suspended Configuration (SuspendConfig) and "RRC connection resume. See FIG. 4. The gNB suspends a connection with UL and DL data transmissions and moves the UE from NR RRC_CONNECTED to NR RRC_INACTIVE by sending an RRCRelease message with suspend indication or configuration to the UE. This may happen for example after the UE has been inactive for a certain period which causes the gNB internal inactivity timer to expire. Both the UE and the gNB stores the UE context and the associated identifier, referred to as I-RNTI. It has been recently updated that two identifiers will be configured in the suspend configuration, a long and short I-RNTI. The one to be used in resume depends on an indication from the network in system information of the cell the UE tries to resume in. The two I-RNTI identifiers were introduced to support scenarios when the UE is resuming in a cell which only gives the UE a small scheduling grant for the first UL message. For this purpose, also two different resume messages have been introduced namely RRCResumeRequest and RRCResumeRequest1. In the remainder of this document RRC resume request is used to refer to both messages.

At the next transition to NR RRC_CONNECTED, the UE resumes the connection by sending an RRC resume request including the following information to the gNB which the UE attempts to resume the connection towards. It should be noted that it may be another cell/gNB compared to the cell/gNB where the connection was suspended.

- The I-RNTI, either the long or short I-RNTI depending on the system information indication.
- A security token, referred to as resumeMAC-I in the specification, which is used to identify and verify the UE at RRC connection resume.
- An indication of the cause of the resume, e.g. mobile originated data.

The gNB which serves the cell in which the UE is resuming is sometimes referred to as the target gNB, while the gNB serving the cell in which the UE was suspended in is sometimes referred to as the source gNB. To resume the connection, the target gNB determines which gNB is the source gNB, considering the gNB part of the I-RNTI, and request that gNB to send the UE's context. In the request the target provides, among other things, the UE ID and security token received from the UE as well as the target cell ID.

The source gNB then locates the UE context based on the I-RNTI and verifies the request based on the security token, see next section. If successful, the gNB forwards the UE context to the target gNB, which then responds to the UE with RRC resume to confirm the connection is being resumed. The RRC resume message may also comprise configurations to reconfigure the radio bearers being resumed. Finally, the UE acknowledges the reception of the RRC re-establishment by sending RRC re-establishment complete. See FIG. 5.

It should be noted that the described NR RRC resume procedure works in a similar way in LTE and eLTE, i.e. when LTE is connected to 5GC.

For 3GPP Release 15, it is agreed that the UE releases its lower-layer SCG configuration in RRC_INACTIVE. However, keeping the lower layer SCG configuration in RRC_INACTIVE will be discussed in the scope of the DC and/or CA enhancements, and is likely to be enabled. It is also expected that the suspend and/or resume concerning SCG may be captured within current defined messages and procedures for suspend and/or resume. Therefore, no distinct behavior would be given to SCG configuration compared to MCG configuration when suspended and/or resumed, i.e. when suspending the UE, both MCG and SCG are suspended, which would require some coordination between MN and SN; when resuming the UE, both MCG and SCG are resumed, which would also require some coordination between MN and SN.

It is not only the RRCResume message that may be sent in response to the RRCResumeRequest message.

In NR and eLTE, after the UE sends an RRC Resume Request kind of message, e.g. RRCResumeRequest message or RRCResumeRequest1 message, the UE may receive a message on SRB1 that should also be encrypted, and integrity protected, as described above:

RRCRelease with suspend configuration moving the UE to RRC_INACTIVE;

RRCRelease without suspend configuration moving the UE to RRC_IDLE;

RRCResume moving the UE to RRC_CONNECTED;

Other messages may also be transmitted, an RRCReject message with wait timer or RRCSetup message (fallback to RRC_IDLE) but on SRB0, i.e. not encrypted or integrity protected. An SRB is a Signaling Radio Bearer. All these possible responses are shown as follows in the specifications:

FIG. 6A depicts a scenario of a RRC connection resume, successful. In this scenario the UE sends an RRCResumeRequest message to the Network. The network then sends an RRCResume message to the UE which responds to the network with an RRCResumeComplete message.

FIG. 6B depicts a scenario of a RRC connection resume fall back to RRC connection establishment, successful. In this scenario the UE sends an RRCResumeRequest message to the Network. The network then sends an RRCSetup message to the UE which responds to the network with an RRCSetupComplete message.

FIG. 6C depicts a scenario of an RRC connection resume followed by network release, successful. In this scenario the UE sends an RRCResumeRequest message to the Network. The network then sends an RRCRelease message to the UE.

FIG. 6D depicts a scenario of an RRC connection resume followed by network suspend, successful. In this scenario the UE sends an RRCResumeRequest message to the Network. The network then sends an RRCRelease with suspend configuration message to the UE.

FIG. 6E depicts a scenario of an RRC connection resume, network reject. In this scenario the UE sends an RRCResumeRequest message to the Network. The network then sends an RRCReject message to the UE.

RRC Message Structures

In this section, the structure of the messages, reconfiguration and resume and also related Information Elements (IEs) are shown, considering that the MN is a gNB. For an ng-eNB as the MN, different messages are defined in clause 6.2.2 from 3GPP TS 36.331 RRCConnectionReconfiguration, and RRCConnectionResume messages, though the behavior is similar to gNB as the MN, as detailed in section 2.13 and 2.14.

RRCReconfiguration Message

The NR RRCReconfiguration message is shown below:

```
-- ASN1START
-- TAG-RRCRECONFIGURATION-START
RRCReconfiguration ::=          SEQUENCE {
   rrc-TransactionIdentifier       RRC-TransactionIdentifier,
   criticalExtensions           CHOICE {
      rrcReconfiguration           RRCReconfiguration-IEs,
      criticalExtensionsFuture              SEQUENCE { }
   }
}
RRCReconfiguration-IEs ::=        SEQUENCE {
   radioBearerConfig               RadioBearerConfig
OPTIONAL, -- Need M
   secondaryCellGroup              OCTET STRING (CONTAINING
CellGroupConfig)                   OPTIONAL, -- Need M
   measConfig                   MeasConfig
OPTIONAL, -- Need M
   lateNonCriticalExtension               OCTET STRING
OPTIONAL,
   nonCriticalExtension             RRCReconfiguration-v1530-IEs
OPTIONAL
}
RRCReconfiguration-v1530-IEs ::=            SEQUENCE {
   masterCellGroup               OCTET STRING (CONTAINING
CellGroupConfig)                   OPTIONAL, -- Need M
   fullConfig                   ENUMERATED {true}
OPTIONAL, -- Cond FullConfig
   dedicatedNAS-MessageList               SEQUENCE
                                          (SIZE(1 . . . maxDRB) )
OF DedicatedNAS-Message                   OPTIONAL, -- Cond nonHO
```

-continued

```
  masterKeyUpdate                MasterKeyUpdate
OPTIONAL, -- Cond MasterKeyChange
  dedicatedSIB1-Delivery            OCTET STRING (CONTAINING
SIB1)                 OPTIONAL, -- Need N
  dedicatedSystemInformationDelivery          OCTET STRING
(CONTAINING SystemInformation)              OPTIONAL, --
Need N
  otherConfig                    OtherConfig
OPTIONAL, -- Need N
  nonCriticalExtension              RRCReconfiguration-v15xy-IEs
OPTIONAL
}
RRCReconfiguration-v15xy-IEs ::=          SEQUENCE {
  mrdc-SecondaryCellGroup                CHOICE {
      nr-SCG      OCTET STRING,
      eutra-SCG      OCTET STRING
  }
OPTIONAL, -- Need M
  radioBearerConfig2             OCTET STRING (CONTAINING
RadioBearerConfig)               OPTIONAL, -- Need M
  sk-Counter                  INTEGER (0 . . . 65535)
OPTIONAL, -- Cond S-KeyChange
  nonCriticalExtension             SEQUENCE { }
OPTIONAL

}
MasterKeyUpdate ::=             SEQUENCE {
  keySetChangeIndicator            BOOLEAN,
  nextHopChainingCount        NextHopChainingCount,
  nas-Container               OCTET STRING
        OPTIONAL, -- Cond securityNASC
  . . .
}
```

The information elements underlined above are described below.

RadioBearerConfig: This is the IE that holds the configuration of the radio bearers (DRBs and SRBs). A UE may have two radio bearer configurations (radioBearerConfig and radioBearerConfig2). RadioBeaerConfig2 is usually used when the UE is in DC, but it can be used even before the UE is standalone mode (i.e. to prepare for a DC). The radioBearerConfig and radioBearerConfig2 are mainly distinguished by the security configuration (keys, algorithms) used by the PDCP. Normally, radioBearerConfig holds the configuration of the bearers associated with the master key while radioBearerConfig2 holds the configuration of the bearers associated with the secondary key. However, it is up to the network to decide which IE to associate to which key, because the radio bearer configuration contains the key to use as well (i.e. radioBeaerConfig2 can be associated with the secondary key). The structure of the radioBearerConfig is shown below:

```
-- ASN1START
-- TAG-RADIO-BEARER-CONFIG-START
RadioBearerConfig ::=               SEQUENCE {
  srb-ToAddModList            SRB-ToAddModList
OPTIONAL, -- Cond HO-Conn
  srb3-ToRelease             ENUMERATED{true}
OPTIONAL, -- Need N
  drb-ToAddModList            DRB-ToAddModList
OPTIONAL, -- Cond HO-toNR
  drb-ToReleaseList                DRB-ToReleaseList
OPTIONAL, -- Need N
  securityConfig             SecurityConfig
OPTIONAL, -- Need M
  . . .
}
SRB-ToAddModList ::=         SEQUENCE (SIZE (1 . . . 2) ) OF SRB-
ToAddMod
SRB-ToAddMod ::=           SEQUENCE {
  srb-Identity              SRB-Identity,
  reestablishPDCP              ENUMERATED{true}
OPTIONAL, -- Need N
  discardOnPDCP              ENUMERATED{true}
OPTIONAL, -- Need N
  pdcp-Config              PDCP-Config
OPTIONAL, -- Cond PDCP
  . . .
}
DRB-ToAddModList ::=         SEQUENCE (SIZE (1 . . . maxDRB) ) OF
DRB-ToAddMod
```

-continued

```
DRB-ToAddMod ::=           SEQUENCE {
   cnAssociation             CHOICE {
      eps-BearerIdentity                    INTEGER (0 . . . 15),
-- EPS-DRB-Setup
      sdap-Config                  SDAP-Config
-- 5GC
   }                   OPTIONAL, -- Cond DRBSetup
   drb-Identity              DRB-Identity,
   reestablishPDCP              ENUMERATED{true}
OPTIONAL, -- Need N
   recoverPDCP             ENUMERATED{true}
OPTIONAL, -- Need N
   pdcp-Config             PDCP-Config
OPTIONAL, -- Cond PDCP
   . . .
}
DRB-ToReleaseList ::=              SEQUENCE (SIZE (1 . . . maxDRB) )
OF DRB-Identity
SecurityConfig ::=            SEQUENCE {
   securityAlgorithmConfig                  SecurityAlgorithmConfig
OPTIONAL, -- Cond RBTermChange
   keyToUse             ENUMERATED{master, secondary}
OPTIONAL, -- Cond RBTermChange
   . . .
}
```

sk-counter: is an integer that is used to derive the secondary key. When the UE is configured with DC (or pre-prepared for DC), the sk-counter is provided to it, and it derives the secondary key based on that. From the secondary key, and the indicated algorithms in the SecurityConfig included in the radioBearerConfig, the encryption and integrity protection keys are derived and the PDCPs of all the radio bearers associated with the secondary key will use these keys to perform encryption/decryption and integrity protection/verification.

mastercellGroup: This includes the lower layer (RLC, MAC, PHY) configuration during standalone configuration, and also for the master leg during a DC setup.

mrdc-SecondaryCellGroup: This includes the lower layer configuration for the secondary cell group when DC is configured. For the case of NE-DC, this will include eutra-SCG, while for the case of NR-DC, it will include the NR cell group configuration.

In the case of EN-DC, NR is the secondary cell group and for this case, the IE secondaryCellGroup is used (i.e. the master cell group in this case will be an EUTRA cell group and is provided to the UE via the LTE RRCConnectionReconfiguration message)

The structure of the cell group config IE is shown below (cellGroupID of 0 indicates the master cell):

CellGroupConfig Information Element

```
-- ASN1START
-- TAG-CELL-GROUP-CONFIG-START
-- Configuration of one Cell-Group:
CellGroupConfig ::=            SEQUENCE {
   cellGroupId              CellGroupId,
   rlc-BearerToAddModList              SEQUENCE (SIZE(1 . . . maxLC-
ID)) OF RLC-BearerConfig        OPTIONAL, -- Need N
   rlc-BearerToReleaseList              SEQUENCE (SIZE(1 . . . maxLC-
ID)) OF LogicalChannelIdentity       OPTIONAL, -- Need N
   mac-CellGroupConfig             MAC-CellGroupConfig
OPTIONAL, -- Need M
   physicalCellGroupConfig              PhysicalCellGroupConfig
OPTIONAL, -- Need M
   spCellConfig              SpCellConfig
OPTIONAL, -- Need M
   sCellToAddModList             SEQUENCE (SIZE
(1 . . . maxNrofSCells) ) OF SCellConfig          OPTIONAL, -- Need
N
   sCellToReleaseList              SEQUENCE (SIZE
(1 . . . maxNrofSCells) ) OF SCellIndex        OPTIONAL, -- Need
N
   . . .,
   [[
   reportUplinkTxDirectCurrent-v1530           ENUMERATED {true}
OPTIONAL -- Cond BWP-Reconfig
   ]]
}
-- Serving cell specific MAC and PHY parameters for a
SpCell:
SpCellConfig ::=             SEQUENCE {
   servCellIndex              ServCellIndex
```

-continued

```
OPTIONAL, -- Cond SCG
   reconfigurationWithSync          ReconfigurationWithSync
OPTIONAL, -- Cond ReconfWithSync
   rlf-TimersAndConstants         SetupRelease { RLF-
TimersAndConstants }                         OPTIONAL, -- Need M
   rlmInSyncOutOfSyncThreshold    ENUMERATED {n1}
OPTIONAL, -- Need S
   spCellConfigDedicated          ServingCellConfig
OPTIONAL, -- Need M
   . . .
}
ReconfigurationWithSync ::=       SEQUENCE {
   spCellConfigCommon         ServingCellConfigCommon
OPTIONAL, -- Need M
   newUE-Identity               RNTI-Value,
   t304                         ENUMERATED {ms50, ms100, ms150,
ms200, ms500, ms1000, ms2000, ms10000},
      rach-ConfigDedicated          CHOICE {
         uplink                     RACH-ConfigDedicated,
         supplementaryUplink        RACH-ConfigDedicated
   }
OPTIONAL, -- Need N
   . . .,
   [[
   smtc                         SSB-MTC
OPTIONAL -- Need S
   ]]
}
SCellConfig ::=                 SEQUENCE {
   sCellIndex                   SCellIndex,
   sCellConfigCommon          ServingCellConfigCommon
OPTIONAL, -- Cond SCellAdd
   sCellConfigDedicated          ServingCellConfig
OPTIONAL, -- Cond SCellAddMod
   . . .,
   [[
   smtc                         SSB-MTC
OPTIONAL -- Need S
   ]]
}
-- TAG-CELL-GROUP-CONFIG-STOP
-- ASN1STOP
```

RRCResume

The structure of the RRCResume message is shown below:

RRCResume Message

```
-- ASN1START
-- TAG-RRCRESUME-START
RRCResume ::=              SEQUENCE {
   rrc-TransactionIdentifier             RRC-TransactionIdentifier,
   criticalExtensions                  CHOICE {
      rrcResume              RRCResume-IEs,
      criticalExtensionsFuture                        SEQUENCE { }
   }
}
RRCResume-IEs ::=           SEQUENCE {
   radioBearerConfig                   RadioBearerConfig
OPTIONAL, -- Need M
   masterCellGroup               OCTET STRING (CONTAINING
CellGroupConfig)                   OPTIONAL, -- Need M
   measConfig                MeasConfig
OPTIONAL, - Need M
   fullConfig                ENUMERATED {true}
OPTIONAL, - Need N
   lateNonCriticalExtension            OCTET STRING
OPTIONAL,
   nonCriticalExtension                RRCResume-v15xx-IEs
OPTIONAL
}
RRCResume-v15xx-IEs ::=           SEQUENCE {
   radioBearerConfig2-r15x            OCTET STRING (CONTAINING
```

-continued

```
RadioBearerConfig)                OPTIONAL, -- Need M
  sk-Counter-r15x            INTEGER (0 . . . 65535)
OPTIONAL, -- Need N
  mrdc-SecondaryCellGroup          CHOICE {
    nr-SCG                OCTET STRING,
    eutra-SCG              OCTET STRING
  }
OPTIONAL, -- Need M
  nonCriticalExtension              SEQUENCE{ }
OPTIONAL
}
```

It should be noted that the NR specification is still evolving and the RRCReconfiguration and RRCResume messages shown above are not exactly the ones that can be found in the agreed specifications right now. For example, as of this writing, neither the reconfiguration nor the resume message contain the mrdc-SecondaryCellGroup field. We are assuming these will be introduced in the upcoming versions and the names that will be used in the specifications might end up being different.

Measurements in LTE/NR

The network may configure a UE to perform measurements, mainly for mobility reasons. The measurement framework in NR is mainly adopted from LTE, but supports additional features such as e.g.:

In LTE, the UE uses cell-specific Reference Signals (RS), while in NR the network may configure which RS type to be used: Synchronization Signal/Physical Broadcast Channel (SS/PBCH) block or Channel State Information-Reference Signals (CSI-RS).

The reference signals in NR can be beamformed and transmitted in different beams, especially when NR is deployed in higher frequencies. In that sense, for each RS type and for each cell, the UE may detect multiple beams where each beam has an RS index. For SS/PBCH block, there will be a beam identifier encoded by the combination of the Demodulation Reference Signal (PBCH)/DMRS sequence identifier and possibly an explicit time index encoded in PBCH. For CSI-RS, there will be a configurable CSI-RS resource index.

In the following, it is mainly focused on measurements related to NR, but most of the ideas are similar also in LTE, see 3GPP TS 36.331 section 5.5 and TS 38.331 Section 5.5 for the details of measurement configurations/operations in LTE and NR, respectively.

The NR measurement configuration comprises the following parameters:

1. Measurement objects: A list of objects on which the UE shall perform the measurements.
   For intra-frequency and inter-frequency measurements, a measurement object is associated to an NR carrier frequency. Associated with this NR carrier frequency, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
   For inter-RAT E-UTRA measurements a measurement object is a single EUTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.
2. Reporting configurations: A list of reporting configurations where there can be one or multiple reporting configurations per measurement object. Each reporting configuration comprises the following:
   Reporting criterion: The criterion that triggers the UE to send a measurement report. This can either be periodical or a single event description.
   RS type: The RS that the UE uses for beam and cell measurement results, SS/PBCH block or CSI-RS.
   Reporting format: The quantities per cell and/or per beam that the UE includes in the measurement report, e.g. RSRP, and other associated information such as the maximum number of cells and the maximum number beams per cell to report.
3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.
4. Quantity configurations: The quantity configuration defines the measurement filtering configuration used for all event evaluation and related reporting of that measurement type. For NR measurements, the network may configure up to 2 quantity configurations with a reference in the NR measurement object to the configuration that is to be used. In each configuration, different filter coefficients may be configured for different measurement quantities, for different RS types, and for measurements per cell and per beam.
5. Measurement gaps: Periods that the UE may use to perform measurements, i.e. no UL, DL transmissions are scheduled.

An RRC_CONNECTED UE maintains a single measurement object list, a single reporting configuration list, and a single measurement identities list. The measurement object list possibly includes NR intra-frequency object(s), NR inter-frequency object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

The measurement procedures distinguish the following types of cells:

1. The serving cell(s)—these are the SpCell (Special cells, In case of DC, the PCell of the MCG or the PSCell of the SCG) and one or more SCells, if configured for a UE supporting CA.
2. Listed cells—these are cells listed within the measurement object(s).
3. Detected cells—these are cells that are not listed within the measurement object(s) but are detected by the UE on the carrier frequency(ies) indicated by the measurement object(s).

For NR measurement object(s), the UE measures and reports on the serving cell(s), listed cells and/or detected cells.

Measurements in NR may be configured to be reported periodically or based on events. If a UE is configured with a periodic measurement reporting, then it will send available measurement every time the assigned periodicity for that measurement expires. When it comes to event triggered measurement reporting, there are several events defined:

Event A1 (Serving Becomes Better Than Threshold)

The UE shall:

1> consider the entering condition for this event to be satisfied when condition A1-1, as specified below, is fulfilled;

1> consider the leaving condition for this event to be satisfied when condition A1-2, as specified below, is fulfilled;

1> for this measurement, consider the NR serving cell corresponding to the associated measObjectNR associated with this event.

Inequality A1-1 (Entering condition)

$$Ms - Hys > \text{Thresh}$$

Inequality A1-2 (Leaving condition)

$$Ms + Hys < \text{Thresh}$$

The variables in the formula are defined as follows:

Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a1-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

Event A2 (Serving Becomes Worse Than Threshold)

The UE shall:

1> consider the entering condition for this event to be satisfied when condition A2-1, as specified below, is fulfilled;

1> consider the leaving condition for this event to be satisfied when condition A2-2, as specified below, is fulfilled;

1> for this measurement, consider the serving cell indicated by the measObjectNR associated to this event.

Inequality A2-1 (Entering condition)

$$Ms + Hys < \text{Thresh}$$

Inequality A2-2 (Leaving condition)

$$Ms - Hys > \text{Thresh}$$

The variables in the formula are defined as follows:

Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a2-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

Event A3 (Neighbour Becomes Offset Better Than SpCell)

The UE shall:

1> consider the entering condition for this event to be satisfied when condition A3-1, as specified below, is fulfilled;

1> consider the leaving condition for this event to be satisfied when condition A3-2, as specified below, is fulfilled;

1> use the SpCell for Mp, Ofp and Ocp.

NOTE The cell(s) that triggers the event has reference signals indicated in the measObjectNR associated to this event which may be different from the NR SpCell measObjectNR.

Inequality A3-1 (Entering condition)

$$Mn + Ofn + Ocn - Hys > Mp + Ofp + Ocp + Off$$

Inequality A3-2 (Leaving condition)

$$Mn + Ofn + Ocn + Hys < Mp + Ofp + Ocp + \text{Off}$$

The variables in the formula are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP, or in dB in case of RSRQ and RS-SINR.

Ofn, Ocn, Ofp, Ocp, Hys, Off are expressed in dB.

Event A4 (Neighbour Becomes Better Than Threshold)

The UE shall:

1> consider the entering condition for this event to be satisfied when condition A4-1, as specified below, is fulfilled;

1> consider the leaving condition for this event to be satisfied when condition A4-2, as specified below, is fulfilled.

Inequality A4-1 (Entering condition)

$$Mn + Ofn + Ocn - Hys > \text{Thresh}$$

Inequality A4-2 (Leaving condition)

$$Mn + Ofn + Ocn + Hys < \text{Thresh}$$

The variables in the formula are defined as follows:

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the measurement object specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh is the threshold parameter for this event (i.e. a4-Threshold as defined within reportConfigNR for this event).

Mn is expressed in dBm in case of RSRP, or in dB in case of RSRQ and RS-SINR.

Ofn, Ocn, Hys are expressed in dB.

Thresh is expressed in the same unit as Mn.

Event A5 (SpCell Becomes Worse Than Threshold1 and Neighbour Becomes Better Than Threshold2)

The UE shall:

1> consider the entering condition for this event to be satisfied when both condition A5-1 and condition A5-2, as specified below, are fulfilled;

1> consider the leaving condition for this event to be satisfied when condition A5-3 or condition A5-4, i.e. at least one of the two, as specified below, is fulfilled;

1> use the SpCell for Mp.

NOTE: The parameters of the reference signal(s) of the cell(s) that triggers the event are indicated in the measObjectNR associated to the event which may be different from the measObjectNR of the NR SpCell.

Inequality A5-1 (Entering condition 1)

$$Mp + Hys < \text{Thresh1}$$

Inequality A5-2 (Entering condition 2)

$$Mn + Ofn + Ocn - Hys > \text{Thresh2}$$

Inequality A5-3 (Leaving condition 1)

$$Mp - Hys > \text{Thresh1}$$

Inequality A5-4 (Leaving condition 2)

$$Mn + Ofn + Ocn + Hys < \text{Thresh2}$$

The variables in the formula are defined as follows:

Mp is the measurement result of the NR SpCell, not taking into account any offsets.

Mn is the measurement result of the neighbouring cell, not taking into account any offsets.

Ofn is the measurement object specific offset of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the neighbour cell), and set to zero if not configured for the neighbour cell.

Hys is the hysteresis parameter for this event (i.e. hysteresis as defined within reportConfigNR for this event).

Thresh1 is the threshold parameter for this event (i.e. a5-Threshold1 as defined within reportConfigNR for this event).

Thresh2 is the threshold parameter for this event (i.e. a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

Event A6 (Neighbour Becomes Offset Better Than SCell)

The UE shall:

1> consider the entering condition for this event to be satisfied when condition A6-1, as specified below, is fulfilled;

1> consider the leaving condition for this event to be satisfied when condition A6-2, as specified below, is fulfilled;

1> for this measurement, consider the (secondary) cell corresponding to the measObjectNR associated to this event to be the serving cell.

NOTE: The reference signal(s) of the neighbour(s) and the reference signal(s) of the SCell are both indicated in the associated measObjectNR.

Inequality A6-1 (Entering condition)

$$Mn+Ocn-Hys>Ms+Ocs+\text{Off}$$

Inequality A6-2 (Leaving condition)

$$Mn+Ocn+Hys<Ms+Ocs+\text{Off}$$

The variables in the formula are defined as follows:

Mn is the measurement result of the neighbouring cell, not taking into account any offsets.

Ocn is the cell specific offset of the neighbour cell (i.e. cellIndividualOffset as defined within the associated measObjectNR), and set to zero if not configured for the neighbour cell.

Ms is the measurement result of the serving cell, not taking into account any offsets.

Ocs is the cell specific offset of the serving cell (i.e. cellIndividualOffset as defined within the associated measObjectNR), and is set to zero if not configured for the serving cell.

Hys is the hysteresis parameter for this event (i.e. hysteresis as defined within reportConfigNR for this event).

Off is the offset parameter for this event (i.e. a6-Offset as defined within reportConfigNR for this event).

Mn, Ms are expressed in dBm in case of RSRP, or in dB in case of RSRQ and RS-SINR.

Ocn, Ocs, Hys, Off are expressed in dB.

The ASN.1 coding for the reportConfigNR information element (IE) that is used to configure event based and periodic reporting configurations is shown below:

ReportConfigNR

The IE ReportConfigNR specifies criteria for triggering of an NR measurement reporting event. Measurement reporting events are based on cell measurement results, which either may be derived based on SS/PBCH block or CSI-RS. These events are labelled AN with N equal to 1, 2 and so on.

Event A1: Serving becomes better than absolute threshold;

Event A2: Serving becomes worse than absolute threshold;

Event A3: Neighbour becomes amount of offset better than PCell/PSCell;

Event A4: Neighbour becomes better than absolute threshold;

Event A5: PCell/PSCell becomes worse than absolute threshold1 AND Neighbour/SCell becomes better than another absolute threshold2.

Event A6: Neighbour becomes amount of offset better than SCell.

```
-- ASN1START
-- TAG-REPORT-CONFIG-START
ReportConfigNR ::=                SEQUENCE {
  reportType                        CHOICE {
    periodical                          PeriodicalReportConfig,
    eventTriggered                      EventTriggerConfig,
    . . .,
    reportCGI                           ReportCGI
  }
}
ReportCGI ::=            SEQUENCE
  cellForWhichToReportCGI      PhysCellId,
    . . .
}
EventTriggerConfig::=             SEQUENCE {
  eventId                           CHOICE {
    eventA1                             SEQUENCE {
      a1-Threshold
MeasTriggerQuantity,
      reportOnLeave                         BOOLEAN,
      hysteresis                            Hysteresis,
      timeToTrigger                         TimeToTrigger
    },
    eventA2                             SEQUENCE {
      a2-Threshold
MeasTriggerQuantity,
      reportOnLeave                         BOOLEAN,
      hysteresis                            Hysteresis,
      timeToTrigger                         TimeToTrigger
    },
    eventA3                             SEQUENCE {
```

-continued

```
        |a3-Offset
MeasTriggerQuantityOffset,
        reportOnLeave                  BOOLEAN,
        hysteresis                     Hysteresis,
        timeToTrigger                  TimeToTrigger,
        useWhiteCellList               BOOLEAN
      },
      eventA4                        SEQUENCE {
        a4-Threshold
MeasTriggerQuantity,
        reportOnLeave                  BOOLEAN,
        hysteresis                     Hysteresis,
        timeToTrigger                  TimeToTrigger,
        useWhiteCellList               BOOLEAN
      },
      eventA5                        SEQUENCE {
        a5-Threshold1
MeasTriggerQuantity,
        a5-Threshold2
MeasTriggerQuantity,
        reportOnLeave                  BOOLEAN,
        hysteresis                     Hysteresis,
        timeToTrigger                  TimeToTrigger,
        useWhiteCellList               BOOLEAN
      },
      eventA6                        SEQUENCE {
        a6-Offset
MeasTriggerQuantityOffset,
        reportOnLeave                  BOOLEAN,
        hysteresis                     Hysteresis,
        timeToTrigger                  TimeToTrigger,
        useWhiteCellList               BOOLEAN
      },
      . . .
    },
    rsType                         NR-RS-Type,
    reportInterval                 ReportInterval,
    reportAmount                   ENUMERATED {r1, r2, r4, r8,
r16, r32, r64, infinity},
    reportQuantityCell             MeasReportQuantity,
    maxReportCells                 INTEGER (1 . . . maxCellReport),
    reportQuantityRS-Indexes         MeasReportQuantity
OPTIONAL, -- Need R
    maxNrofRS-IndexesToReport        INTEGER
{1 . . . maxNrofIndexesToReport}              OPTIONAL, --
Need R
    includeBeamMeasurements        BOOLEAN,
    reportAddNeighMeas             ENUMERATED {setup}
OPTIONAL, -- Need R
    . . .
}
PeriodicalReportConfig ::=       SEQUENCE {
    rsType                         NR-RS-Type,
    reportInterval                 ReportInterval,
    reportAmount                   ENUMERATED {r1, r2, r4, r8,
r16, r32, r64, infinity},
    reportQuantityCell             MeasReportQuantity,
    maxReportCells                 INTEGER (1 . . . maxCellReport),
    reportQuantityRS-Ind|exes        MeasReportQuantity
OPTIONAL, -- Need R
    maxNrofRS-IndexesToReport        INTEGER
(1 . . . maxNrofIndexesToReport)              OPTIONAL,
Need R
    includeBeamMeasurements        BOOLEAN,
    useWhiteCellList               BOOLEAN,
    . . .
}
NR-RS-Type ::=                   ENUMERATED {ssb, csi-rs}
MeasTriggerQuantity ::=          CHOICE {
    rsrp                           RSRP-Range,
    rsrq                           RSRQ-Range,
    sinr                           SINR-Range
}
MeasTriggerQuantityOffset ::=    CHOICE {
    rsrp                           INTEGER (-30 . . . 30),
    rsrq                           INTEGER (-30 . . . 30),
    sinr                           INTEGER (-30 . . . 30)
}
MeasReportQuantity ::=           SEQUENCE {
```

-continued

```
  rsrp                          BOOLEAN,
  rsrq                          BOOLEAN,
  sinr                          BOOLEAN
}
-- TAG-REPORT-CONFIG-STOP
-- ASN1STOP
```

When it comes to inter-RAT measurement reporting, the reportConfigInterRAT IE is used, where event based or report based configurations can be made.

Event B1 (Inter RAT Neighbour Becomes Better Than Threshold)

The UE shall:

1> consider the entering condition for this event to be satisfied when condition B1-1, as specified below, is fulfilled;

1> consider the leaving condition for this event to be satisfied when condition B1-2, as specified below, is fulfilled;

Inequality B1-1 (Entering condition)

$$Mn+Ofn+Ocn-Hys>\text{Thresh}$$

Inequality B1-2 (Leaving condition)

$$Mn+Ofn+Ocn+Hys<\text{Thresh}$$

The variables in the formula are defined as follows:

Mn is the measurement result of the inter-RAT neighbour cell, not taking into account any offsets.

Ofn is the measurement object specific offset of the frequency of the inter-RAT neighbour cell (i.e. eutra-Q-OffsetRange as defined within the measObjectEUTRA corresponding to the frequency of the neighbour inter-RAT cell).

Ocn is the cell specific offset of the inter-RAT neighbour cell (i.e. cellIndividualOffset as defined within the measObjectEUTRA corresponding to the neighbour inter-RAT cell), and set to zero if not configured for the neighbour cell.

Hys is the hysteresis parameter for this event (i.e. hysteresis as defined within reportConfigInterRAT for this event).

Thresh is the threshold parameter for this event (i.e. b1-ThresholdEUTRA as defined within reportConfigInterRAT for this event).

Mn is expressed in dBm or in dB, depending on the measurement quantity of the inter-RAT neighbour cell.

Ofn, Ocn, Hys are expressed in dB.

Thresh is expressed in the same unit as Mn.

Event B2 (PCell Becomes Worse Than Threshold1 and Inter RAT Neighbour Becomes Better Than Threshold2)

The UE shall:

1> consider the entering condition for this event to be satisfied when both condition B2-1 and condition B2-2, as specified below, are fulfilled;

1> consider the leaving condition for this event to be satisfied when condition B2-3 or condition B2-4, i.e. at least one of the two, as specified below, is fulfilled;

Inequality B2-1 (Entering condition 1)

$$Mp+Hys<\text{Thresh1}$$

Inequality B2-2 (Entering condition 2)

$$Mn+Ofn+Ocn-Hys>\text{Thresh2}$$

Inequality B2-3 (Leaving condition 1)

$$Mp-Hys>\text{Thresh1}$$

Inequality B2-4 (Leaving condition 2)

$$Mn+Ofn+Ocn+Hys<\text{Thresh2}$$

The variables in the formula are defined as follows:

Mp is the measurement result of the PCell, not taking into account any offsets.

Mn is the measurement result of the inter-RAT neighbour cell, not taking into account any offsets.

Ofn is the measurement object specific offset of the frequency of the inter-RAT neighbour cell (i.e. eutra-Q-OffsetRange as defined within the measObjectEUTRA corresponding to the frequency of the inter-RAT neighbour cell).

Ocn is the cell specific offset of the inter-RAT neighbour cell (i.e. cellIndividualOffset as defined within the measObjectEUTRA corresponding to the neighbour inter-RAT cell), and set to zero if not configured for the neighbour cell.

Hys is the hysteresis parameter for this event (i.e. hysteresis as defined within reportConfigInterRAT for this event).

Thresh1 is the threshold parameter for this event (i.e. b2-Threshold1 as defined within reportConfigInterRAT for this event).

Thresh2 is the threshold parameter for this event (i.e. b2-Threshold2EUTRA as defined within reportConfigInterRAT for this event).

Mp is expressed in dBm in case of RSRP, or in dB in case of RSRQ and SINR.

Mn is expressed in dBm or dB, depending on the measurement quantity of the inter-RAT neighbour cell.

Ofn, Ocn, Hys are expressed in dB.

Thresh1 is expressed in the same unit as Mp.

Thresh2 is expressed in the same unit as Mn.

ReportConfigInterRAT

The IE ReportConfigInterRAT specifies criteria for triggering of an inter-RAT measurement reporting event. The inter-RAT measurement reporting events for E-UTRA are labelled BN with N equal to 1, 2 and so on.

Event B1: Neighbour becomes better than absolute threshold;

Event B2: PCell becomes worse than absolute threshold1 AND Neighbour becomes better than another absolute threshold2;

ReportConfigInterRAT Information Element

```
-- ASN1START
-- TAG-REPORT-CONFIG-INTER-RAT-START
ReportConfigInterRAT ::=                    SEQUENCE {
   reportType                               CHOICE {
      periodical
PeriodicalReportConfigInterRAT,
      eventTriggered
EventTriggerConfigInterRAT,
      reportCGI                                    ReportCGI-EUTRA,
      . . .
   }
}
ReportCGI-EUTRA ::=                         SEQUENCE {
   cellForWhichToReportCGI      EUTRA-PhysCellId,
   . . .
}
EventTriggerConfigInterRAT ::=              SEQUENCE {
   eventId                                  CHOICE {
      eventB1                                      SEQUENCE {
         b1-ThresholdEUTRA
MeasTriggerQuantityEUTRA,
         reportOnLeave                                    BOOLEAN,
         hysteresis                                       Hysteresis,
         timeToTrigger                                    TimeToTrigger,
         . . .
      },
      eventB2                                      SEQUENCE {
         b2-Threshold1
MeasTriggerQuantity,
         b2-Threshold2EUTRA
MeasTriggerQuantityEUTRA,
         reportOnLeave                                    BOOLEAN,
         hysteresis                                       Hysteresis,
         timeToTrigger                                    TimeToTrigger,
         . . .
      },
      . . .
   },
   rsType                         NR-RS-Type,
   reportInterval                           ReportInterval,
   reportAmount                   ENUMERATED {r1, r2, r4, r8, r16,
r32, r64, infinity},
   reportQuantity                 MeasReportQuantity,
   maxReportCells                           INTEGER (1 . . . maxCellReport),
   . . .
}
PeriodicalReportConfigInterRAT ::=          SEQUENCE {
   reportInterval                                  ReportInterval,
   reportAmount                                    ENUMERATED {r1, r2, r4,
r8, r16, r32, r64, infinity},
   reportQuantity                                  MeasReportQuantity,
   maxReportCells                                  INTEGER
(1 . . . maxCellReport),
   . . .
}
MeasTriggerQuantityEUTRA::=                        CHOICE {
   rsrp                                     RSRP-RangeEUTRA,
   rsrq                                     RSRQ-RangeEUTRA,
   sinr                                     SINR-RangeEUTRA
}
RSRP-RangeEUTRA ::=            INTEGER (0 . . . 97)
RSRQ-RangeEUTRA ::=            INTEGER (0 . . . 34)
SINR-RangeEUTRA ::=            INTEGER (0 . . . 127)
-- TAG-REPOST-CONFIG-INTER-RAT-STOP
-- ASN1STOP
```

SUMMARY

An object of embodiments herein is to improve the performance of a user equipment, when it is resumed from a suspended connection, in a communications network using Secondary Cell Group, SCG, configurations.

According to an aspect of embodiments herein, the object is achieved by a method performed by a User Equipment, UE, for handling a Secondary Cell Group, SCG, configuration in a wireless communications network. The UE receives from a network node, an SCG configuration and a trigger condition related to the signal quality of a cell associated with the SCG configuration. The UE then performs signal quality measurements of a cell associated with the SCG configuration. When the trigger condition of the cell is fulfilled according to the received SCG configuration, the UE applies the SCG configuration associated to the cell fulfilling the trigger condition.

According to another aspect of embodiments, the object is achieved by method performed by a network node for handling a Secondary Cell Group, SCG, configuration in a wireless communications network.

The network node sends to a User Equipment, UE, an SCG configuration and a trigger condition related to the signal quality of a cell associated with the SCG configuration. The network node configures the UE to:

- perform signal quality measurements of a cell associated with the SCG configuration, and
- when the trigger condition of the cell is fulfilled according to the received SCG configuration, apply the SCG configuration associated to the cell fulfilling the trigger condition.

According to an aspect of embodiments herein, the object is achieved by a User Equipment, UE, configured to handle a Secondary Cell Group, SCG, configuration in a wireless communications network. The UE is further configured to:

- Receive from a network node, an SCG configuration and a trigger condition related to the signal quality of a cell associated with the SCG configuration,
- perform signal quality measurements of a cell associated with the SCG configuration, and
- when the trigger condition of the cell is fulfilled according to the received SCG configuration, apply the SCG configuration associated to the cell fulfilling the trigger condition.

According to another aspect of embodiments, the object is achieved by a network node configured to handle a Secondary Cell Group, SCG, configuration in a wireless communications network. The network node is further configured to:

- Send to a User Equipment, UE, an SCG configuration and a trigger condition related to the signal quality of a cell associated with the SCG configuration, and
- configure the UE to:
- Perform signal quality measurements of a cell associated with the SCG configuration, and
- when the trigger condition of the cell is fulfilled according to the received SCG configuration, apply the SCG configuration associated to the cell fulfilling the trigger condition.

In this way a faster resumption of SCG is provided as the UE does not need to send measurement reports.

Further, the most appropriate SCG configurations are provided.

BRIEF DESCRIPTION OF THE DRAWINGS

Examples of embodiments herein are described in more detail with reference to attached drawings in which.

DETAILED DESCRIPTION

Figure 1:
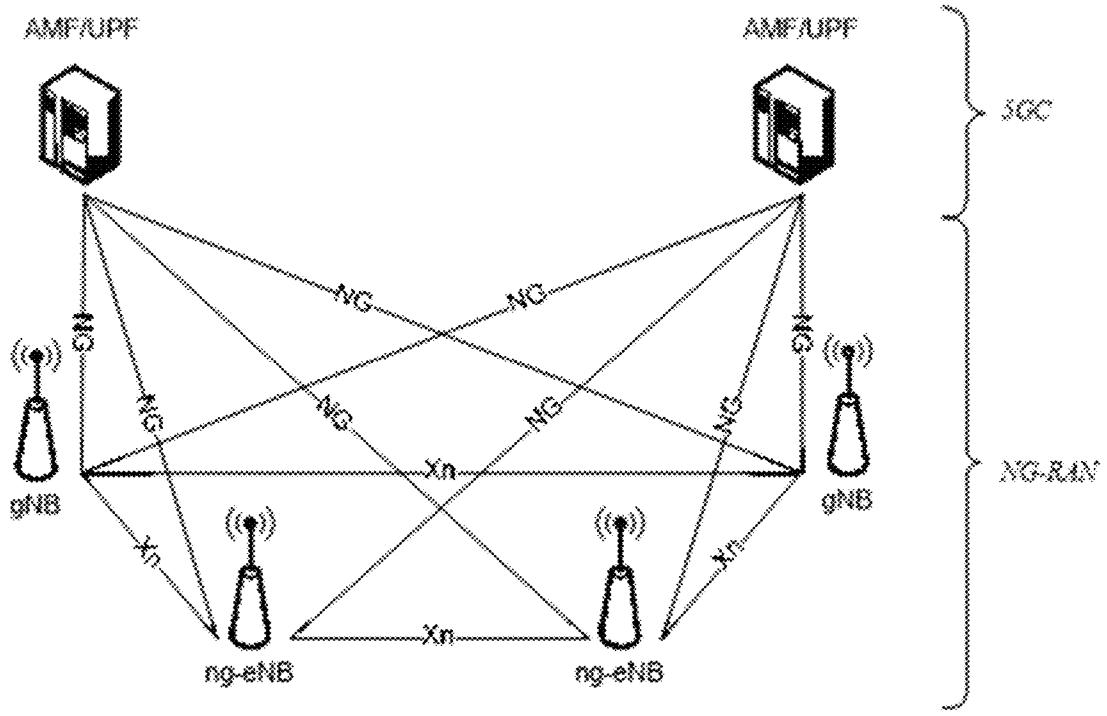
FIG. 1 is a schematic block diagram illustrating prior art.
Figure 2:
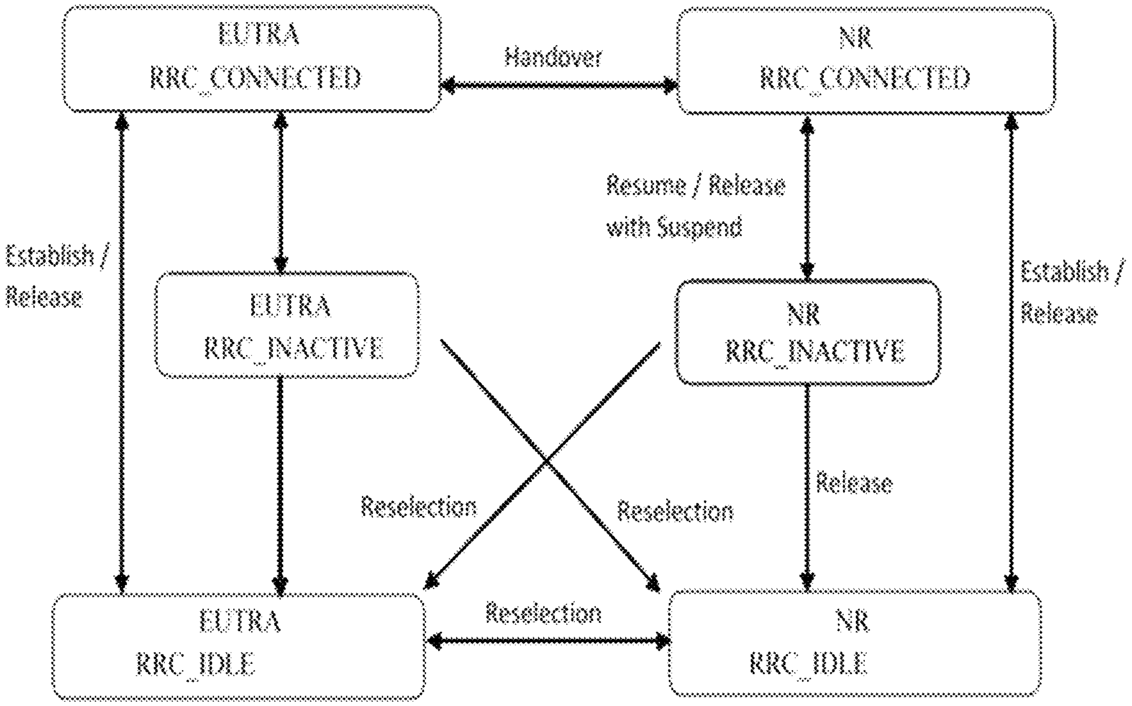
FIG. 2 is a schematic block diagram illustrating prior art.
Figure 3:
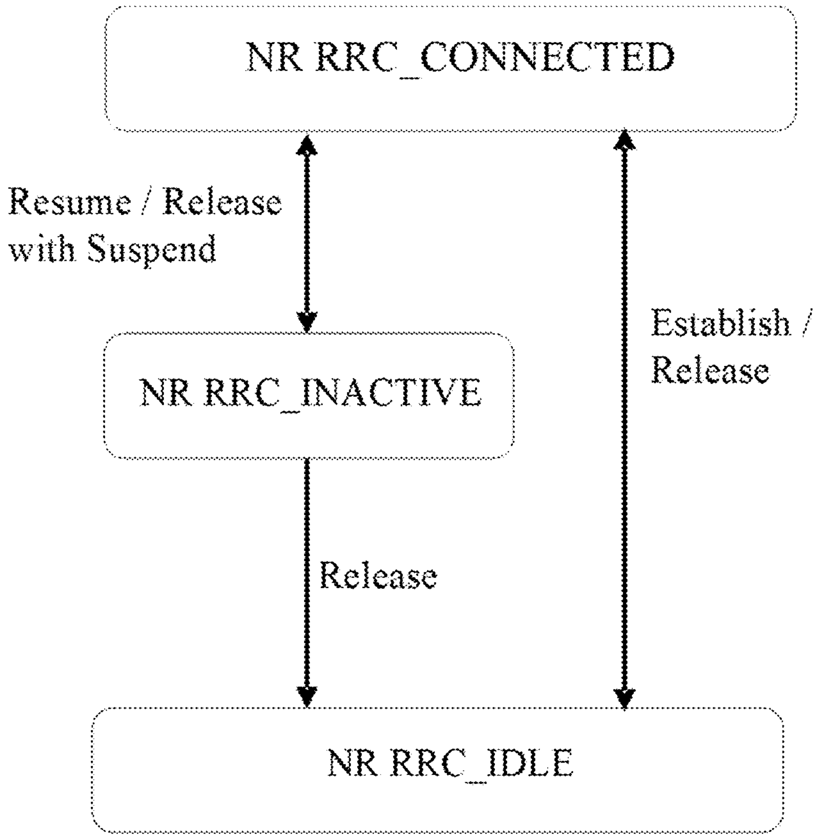
FIG. 3 is a schematic block diagram illustrating prior art.
Figure 4:
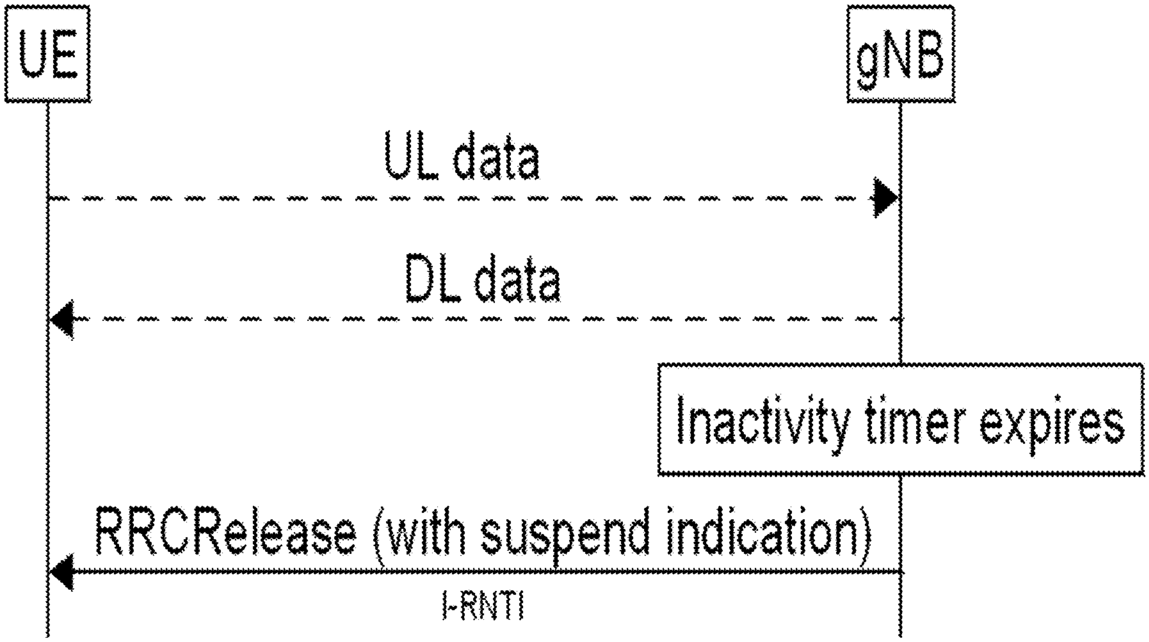
FIG. 4 is a combined flowchart and sequence diagram illustrating prior art.
Figure 5:
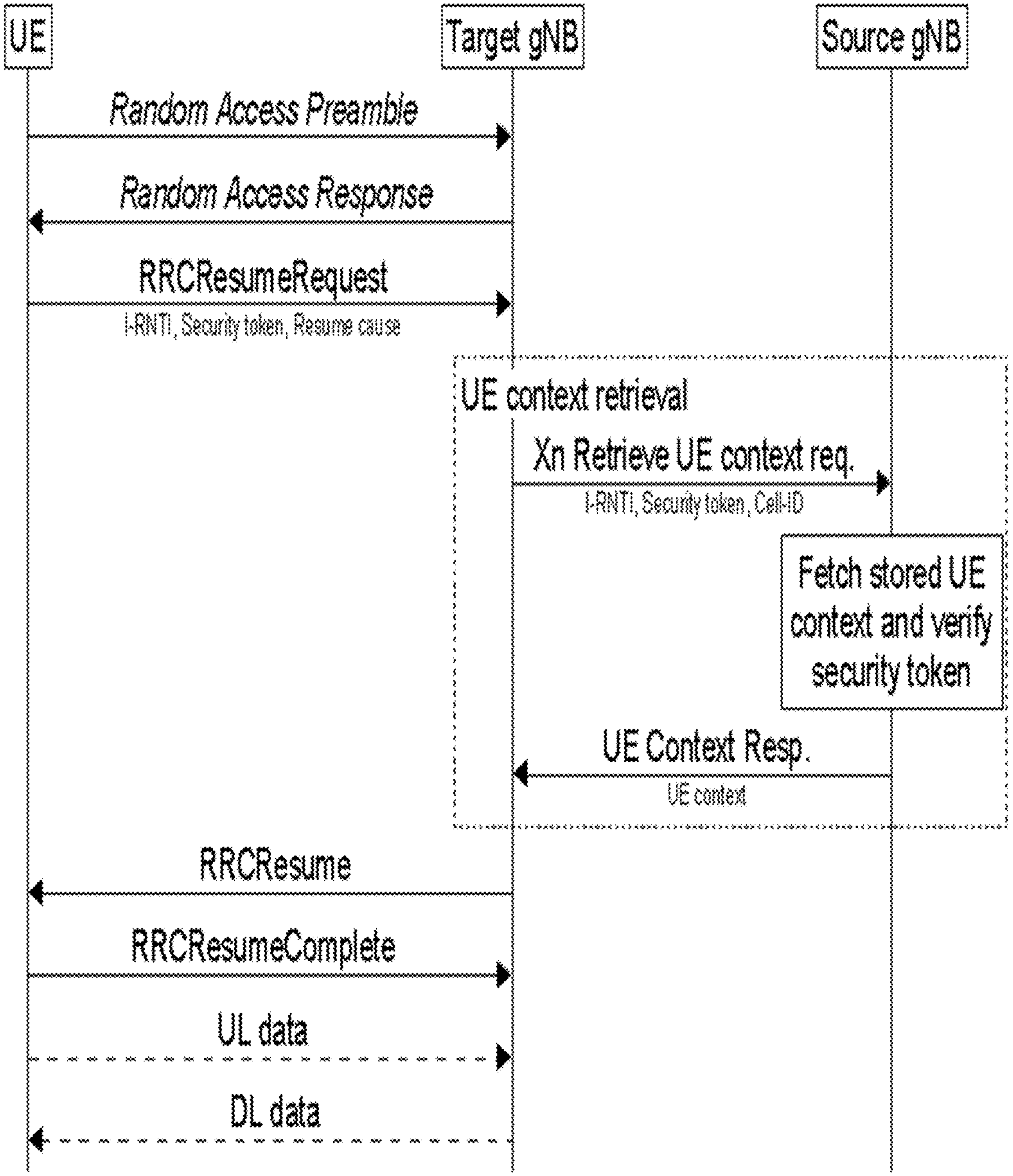
FIG. 5 is a combined flowchart and sequence diagram illustrating prior art.
Figure 6A:
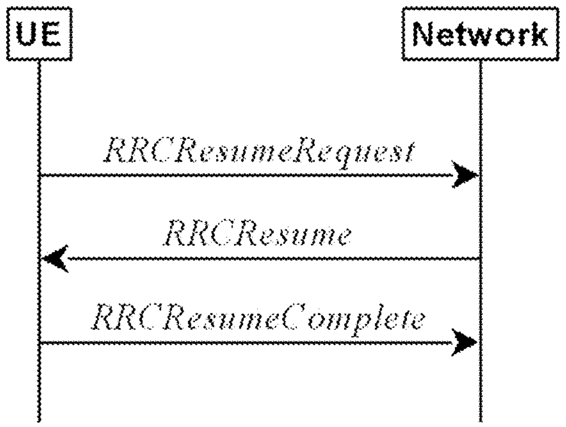
FIG. 6A, FIG. 6B, FIG. 6C, FIG. 6D, and FIG. 6E are sequence diagrams illustrating prior art.
Figure 6B:
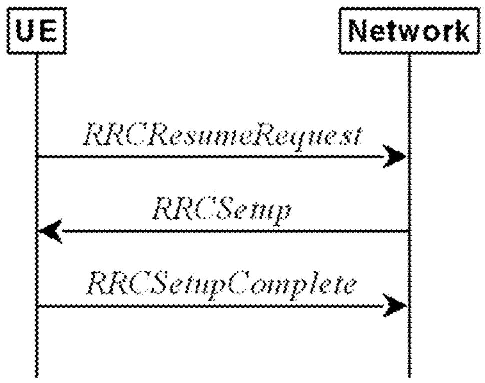
Figure 6C:
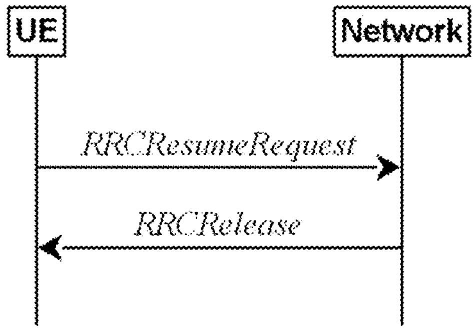
Figure 6D:
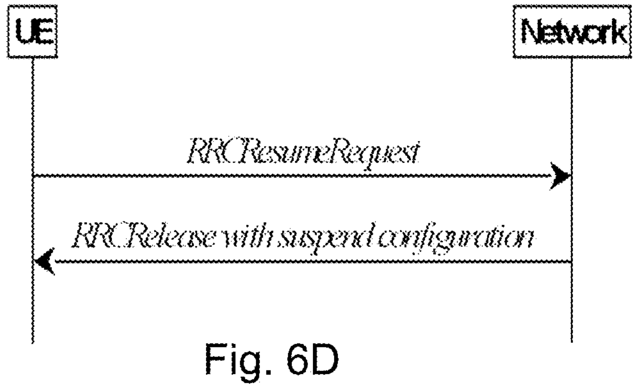
Figure 6E:
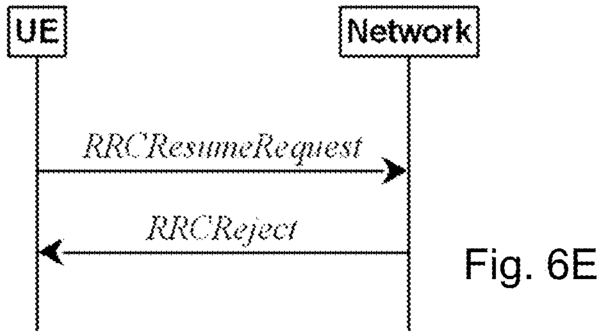

As a part of developing embodiments herein a problem was identified by the inventors and will first be discussed.

The inventors have understood several mechanisms to handle multiple SCG configurations, including adding SCG configurations, removing SCG configurations during inactive/idle to active/connected state transition or during active/connected state. However, when it comes to how the resuming of a particular SCG configuration, only network based, i.e. MN or SN triggered, mechanisms has been discussed. Relaying only on network triggered mechanisms implies that measurements have to be sent by the UE to the network, and the network has to reconfigure the UE before the proper SCG is resumed or network needs to perform these actions blindly. This may lead to delays.

According to example embodiments herein, mechanisms are described to resume an SCG/SCell without the need of an explicit signalling from the network e.g. without the need to wait for the RRCReconfiguration or RRCResume message that will resume the SCG/SCell. The wording SCG/Scell when used herein means SCG and/or Scell. In these embodiments, an SCG/SCell resume may be triggered by a UE once a configured condition(s) is/are met. SCG/Scell may mean SCG or SCell and is also referred to as SCG herein. Thus the wordings SCG and SCG/Scell may be used interchangeably. Those conditions may be, for example, similar to those defined for event triggered measurement reports. E.g. signal thresholds, time to trigger, etc. These conditions to trigger resume SCG/SCell may be linked to a carrier that the UE has suspended SCG/SCell configuration for. In other embodiments, it may also be linked to MCG/PCell carriers or other carriers than those the UE has suspended SCG/SCell configuration for. The wording MCG/Pcell when used herein means MCG and/or Pcell.

According to an example scenario of embodiments herein, when a UE is in RRC_CONNECTED, apart from configuring suspended SCGs/SCells, a MN may also configure the UE with conditions to trigger the resumption of a suspended SCG/SCell configuration. That may be performed e.g. in two different manners:

A network node may provide the UE with a reconfiguration according to the SCG (or SCell) to add and/or to change, e.g. equivalent to an RRCReconfiguration with ReconfigurationWithSync, and upon the fulfilment of a condition for a given cell, e.g. like an Ax event condition, applying a stored RRCReconfiguration associated to that cell;

A network node may provide the UE with a UE AS context identity such as e.g. an I-Radio Network Temporary Identifier (RNTI), or I-RNTI(s)) and a list of potential SCG (or SCell(s)) to add and/or to change and upon the fulfilment of the condition for a given cell, e.g. like an Ax event condition, triggering a resume like procedure with the SCG (and/or SCell). Another alternative for the AS context identifier is to use the UE's source C-RNTI, the source PCI. I-RNTI is used in order to identify UE Context for RRC_INACTIVE state. It is used at NG-RAN level for NR connected to 5GC. C-RNTI is s used for RRC connection and scheduling. In dual connection case, two C-RNTIs are allocated to UE for MCG and SCG functionalities independently.

This results in a faster resumption of SCG, since the MN would not have to wait specific UE measurements to trigger resume procedure. Instead, the UE may directly trigger it once the configured condition(s) is/are met. Those conditions may be, for example, similar to those defined for event triggered measurement reports, e.g. signal thresholds, time to trigger, etc.

Event-triggered such as conditional resume on a suspended SCG (or SCell) configuration based on measurements will result in a faster resumption of SCG as the UE doesn't need to send measurement reports.

It should be noted that the embodiments herein may refer to either generically Multi-Radio Dual Connectivity (MR-DC) or a specific dual connectivity (DC) option e.g., EN-DC or NR-DC, while the solutions described here may be applicable to any MR-DC option but contain examples of a specific DC option.

Even though the sections above mainly treat SCG configuration within the concept of suspend/resume from inactive/idle to active/connected state, the solutions described here are mainly approached in a broader concept, i.e., methods mainly refer to SCG suspend/resume operation in connected mode i.e., activate/deactivate SCG configuration in connected mode. It should be noted that resume and suspend may be interchangeably used with activate and deactivate (respectively) in this document covering inactive/idle and active/connected states.

The description, specifically the messages and procedures, are mostly targeting NR. However, the mechanisms described here are equally applicable for the case where the master is LTE (i.e. EN-DC and NGEN-DC cases). In these cases, corresponding changes in the RRCConnectionReconfiguration, RRCConnectionResume messages and UE behaviour on processing these messages have to be made in the LTE specifications.

Most of the description is for the description where only one SCG is active at one time. However, the methods are equally applicable for the case where more than one SCG is active (i.e. a UE being in DC with more than two nodes).

It should also be noted that even though the discussion here is mainly for DC, the same embodiments could also be extended for CA. In the case of CA, SCG and MCG terminology would be replaced with SCell and PCell respectively and SCell and PCell may be located under the same base station i.e., gNB.

In the aforementioned mechanisms, multiple SCG configurations may refer to: a single SN with multiple SCG configurations; or multiple SNs with one or more SCG configurations.

Figure 7:
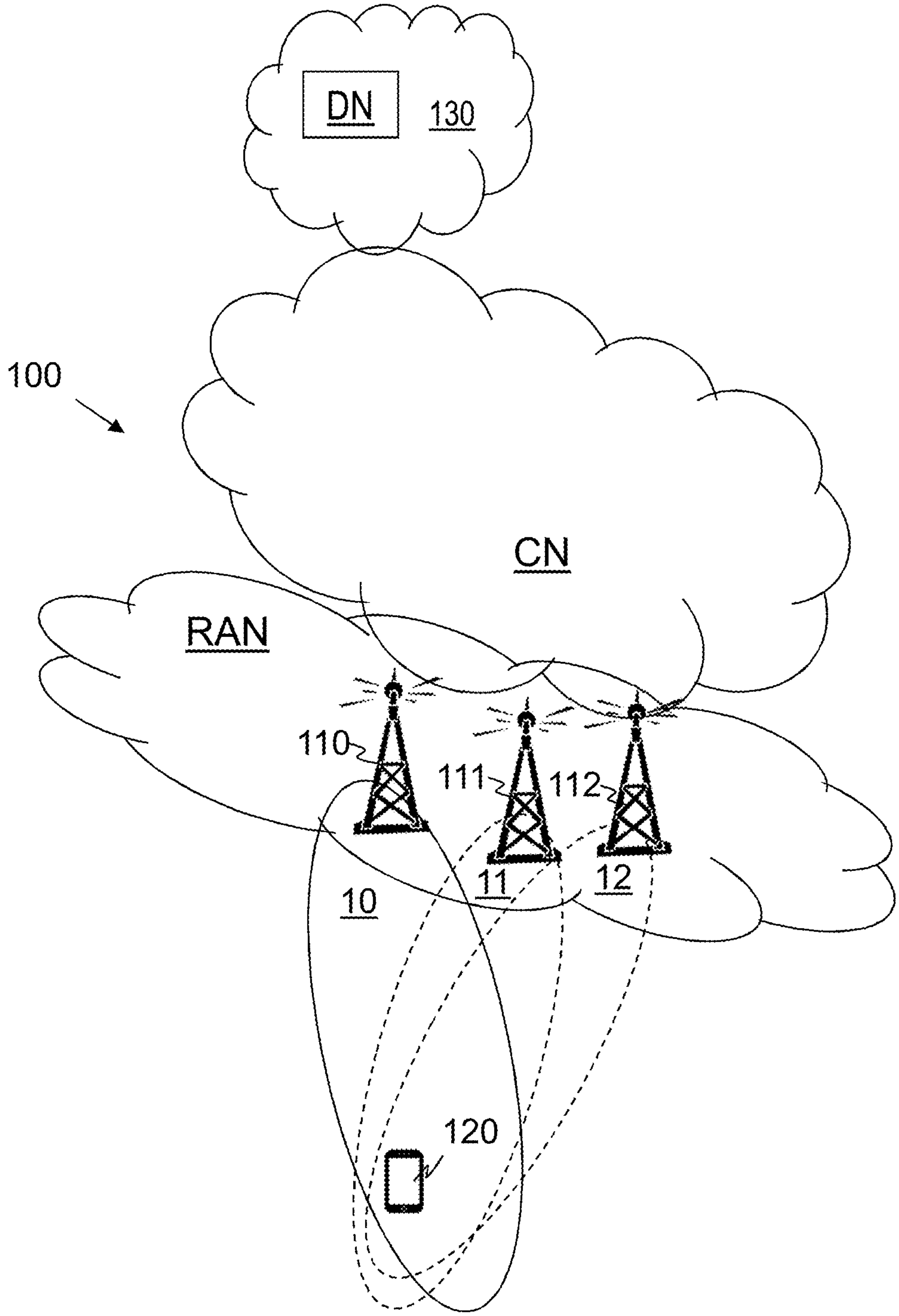
FIG. 7 is a schematic block diagram illustrating embodiments of a wireless communications network.

Embodiments herein relate to wireless communication networks in general. FIG. 7 is a schematic overview depicting a wireless communications network 100. The wireless communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

A number of network nodes operate in the wireless communications network 100 such as e.g. a network node 110, and a number of Secondary Nodes (SNs) such as e.g. a first SN 111 and a second SN 112. These nodes provide radio coverage in a number of cells which may also be referred to as a beam or a beam group of beams, such as a cell 10 provided by the network node 110, a cell 11 provided by the first SN 111, and a cell 12 provided by the second SN 112.

The network node 110 may e.g. be acting as a Master Node (MN) or an SN when serving a UE 120 in the wireless communications network 100, according to embodiments herein. The first SN 111 may e.g. be acting as a source SN, and the second SN 112 may e.g. be acting as a target SN when serving the UE 120 in the wireless communications network 100, according to embodiments herein.

The network node 110, the first SN 111 and the second SN 112 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), ng-eNB, a base transceiver station, a radio remote unit, an Access Point Base Station, a base station router, a transmission arrangement of a radio base station, a stand-alone access point or any other network unit capable of communicating with a wireless device within the service area served by the network node 110 depending e.g. on the first radio access technology and terminology used. The radio network node 110 may be referred to as a serving radio network node and communicates with a UE 120 with Downlink (DL) transmissions to the UE 120 and Uplink (UL) transmissions from the UE 120.

In the wireless communication network 100, one or more UEs operate, such as e.g. the UE 120. The UE 120 may also referred to as a device, an IoT device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the UE 120 and the network node 110. As an alternative, a Distributed Node (DN) and functionality, e.g. comprised in a cloud 130 as shown in FIG. 7, may be used for performing or partly performing the methods herein.

The above described problem is addressed in a number of embodiments, some of which may be seen as alternatives, while some may be used in combination.

Figure 8:
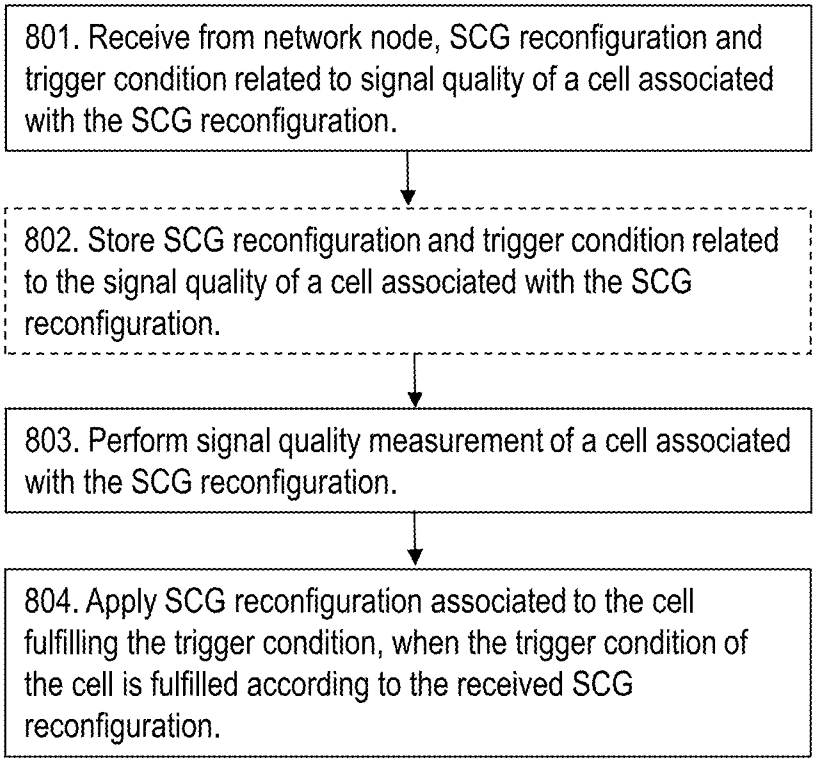
FIG. 8 is a flowchart depicting embodiments of a method in a UE.

FIG. 8 shows an example method performed by the UE 120. The method may be for handling an SCG configuration in the wireless communications network 100. As a summary of embodiments herein, some of the method actions performed by the UE 120 will be described here. The method comprises one or more of the following actions, which actions may be taken in any suitable order.

Action 801. The UE 120 receives from a network node 110, an SCG configuration and a trigger condition related to the signal quality of a cell associated with the SCG configuration. The SCG configuration and trigger condition will be used by the UE 120 for resuming a suspended SCG configuration without the need of an explicit signalling from the network node 110.

The triggering condition may be referred to as a triggering condition configuration. This action may be performed when the UE 120 is in connected mode and has an active SCG configuration. The UE 120 may thus be e.g. configured with conditions to trigger a resumption of a SCG configuration that has been suspended.

It should be noted that the signal quality referred to herein may comprise any quality of a signal in a cell such as e.g. any one or more of: the signal strength, reference signal received power, Signal-to-Noise-Ratio (SNR), Signal-to-Interference-plus-Noise-Ratio (SINR).

In some embodiments, the trigger condition comprises an event condition. E.g. similar to event A4, a Bx event, or a B1 event or any other triggering condition equivalent to an Ax event.

The trigger condition may in some embodiments, comprise an event condition that is fulfilled when a neighbour cell becomes better than an absolute threshold.

The received SCG configuration may comprise an RRC reconfiguration with a Reconfiguration With Synchronization associated with the SCG configuration to be applied associated with the trigger condition to be fulfilled.

This may mean that the received SCG configuration may be comprised in an RRC reconfiguration message, e.g. including a Reconfiguration With Synchronization associated with the SCG configuration to be applied associated with the trigger condition to be fulfilled.

A Reconfiguration With Synchronization when used herein means an RRC Reconfiguration message that includes information that will be used by the UE to get synchronization with the secondary node.

The received SCG configuration may comprise a UE Access Stratum, AS, context identity and information about one or more potential, SCG configurations e.g. in a list of SCG or SCells, to apply.

Action 802. The UE 120 may in some embodiments store the SCG configuration and the trigger condition related to the signal quality of a cell associated with the SCG configuration.

According to an example scenario, the UE 120 may then have no active radio link connection to the referred SCG or UE 120 may have removed such as e.g. disconnected from, the referred SCG. This means that the used UE 120 SCG configuration is suspended. The UE 120 may then need to resume the suspended SCG configuration.

Action 803. The UE 120 performs signal quality measurements of a cell associated with the SCG configuration. This is to keep track of when the trigger condition for the cell is fulfilled. According to embodiments herein the signal quality measurements are not reported back to the network node 110.

Action 804. When the trigger condition of the cell is fulfilled according to the received SCG configuration, the UE 120 applies the SCG configuration associated to the cell fulfilling the trigger condition. According to embodiments herein, this is performed by the UE 120 itself, in some embodiments without any assistance or instructions from the network node 110. In some embodiments, instructions such as e.g. which random access preamble will be used when accessing a cell associated to the SCG may be given e.g., together with the SCG configuration and/or trigger condition or separately.

Thus the SCG configuration, in some embodiments the suspended SCG configuration, has been resumed. This is without the need of an explicit signalling from the network node 110 e.g. without the need to wait for the RRCReconfiguration or RRCResume message that will resume the SCG/SCell.

Figure 9:
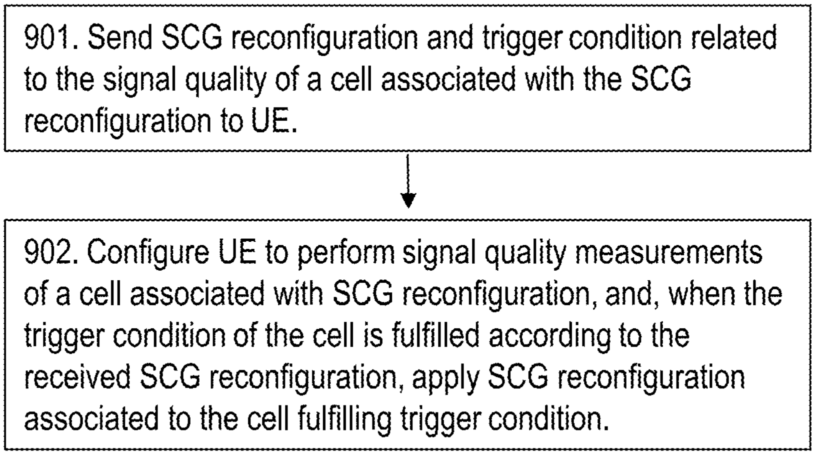
FIG. 9 is a flowchart depicting embodiments of a method in a network node.

FIG. 9 shows an example method performed by the network node 110. The method may be for handling an SCG configuration in the wireless communications network 100. As a summary of embodiments herein, some of the method actions performed by the network node 110 will be described here. The method comprises one or more of the following actions, which actions may be taken in any suitable order.

Action 901

The network node 110 sends to the UE 120, an SCG configuration and a trigger condition related to the signal quality of a cell associated with the SCG configuration. This may be sent to the UE 120 when it is in connected mode. The SCG configuration and trigger condition will be used by the UE 120 for resuming a suspended SCG configuration without the need of an explicit signalling from the network node 110.

In some embodiments the configuring of the UE (120) further comprises configuring the UE 120 to store the SCG configuration and the trigger condition related to the signal quality of a cell associated with the SCG configuration.

The trigger condition may comprise an event condition. E.g. similar to event A4, a Bx event, or a B1 event or any other triggering condition equivalent to an Ax event.

The trigger condition may comprise an event condition that is fulfilled when a neighbour cell becomes better than absolute threshold.

The sent SCG configuration may comprise an RRC reconfiguration with a Reconfiguration With Synchronization associated with the SCG configuration to be applied associated with the trigger condition to be fulfilled.

The sent SCG configuration may comprises a UE Access Stratum (AS) context identity and information about one or more potential, SCG configurations e.g. in a list of SCG or SCells, to apply.

Action 902

By means of the sent SCG configuration and a trigger condition, network node 110 configures the UE (120) to:

perform signal quality measurements of a cell associated with the SCG configuration, and when the trigger condition of the cell is fulfilled according to the received SCG configuration, apply the SCG configuration associated to the cell fulfilling the trigger condition.

The above mentioned embodiments will now be further explained and exemplified below.

SCG Resume Conditions

In some embodiments, the UE 120 is configured with a configuration similar to event A4 such as that Neighbour cell signal quality becomes better than an absolute threshold or any other triggering condition equivalent to an Ax event as defined in reportConfigNR, but unlike the legacy way of sending a measurement report when the conditions are fulfilled, the UE 120 will perform a conditional resume of an SCG. This may be used to resume an NR SCG, e.g. if the network node 110 is an NR master or an LTE SCG, if the network node 110 is an LTE master, as the A4 event is an intra-RAT event.

An example on how this may be realized is shown below where a new event is defined in reportConfigNR, a similar approach may be taken in LTE by defining a similar event in reportConfigEUTRA. The ReportConfigNR specifies criteria for triggering of an NR measurement reporting event.

```
eventAx                        SEQUENCE {
   ax-Threshold                         MeasTriggerQuantity,
   hysteresis                           Hysteresis,
   timeToTrigger                        TimeToTrigger,
→ → → scgToReSumeList          SEQUENCE (SIZE (1 . . . maxSCG) )
                               OF SCG-ID
OPTIONAL, -- Need N
→ → → useWhiteCellList          BOOLEAN
}
SCG-ID ::= INTEGER(1 . . . maxSCG)
```

The scgToResumeList refers to the list of SCG configurations that are associated with the same triggering conditions. If different triggering conditions are to be configured for different SCG configurations, several Ax events may be configured. Since the events are associated with measurement objects that are referring to a certain frequency, if the different SCGs configurations are referring to different frequencies, i.e. the PSCells, then several Ax events will be required, even if the same triggering conditions, e.g. ax-Threshold, are to be configured.

It should be noted that since the definition of the event triggered reporting configuration were made with the assumption that measurement reports will be triggered, some of the Information Elements IEs and/or fields are not relevant for the case of conditional resume according to embodiments herein, e.g. the reportOnLeave field that is used in other event IEs from the event Ax definition above has been removed. Thus, instead of extending the EventTriggerConfig IE by adding a new event, a new IE has been defined according to embodiments herein, e.g. EventTriggerResumeConfig, that excludes these fields. An example is shown below, where the strikeout signifies the items removed from the EventTriggerConfig.

```
EventTriggerResumeConfig::=         SEQUENCE {
   eventId                         CHOICE {
→ eventAx                          SEQUENCE {
      ax-Threshold                          MeasTriggerQuantity,
      hysteresis                            Hysteresis,
      timeToTriggerl                        TimeToTrigger,
→ → → scgToReSumeList          SEQUENCE (SIZE (1 . . . maxSCG) )
                               OF SCG-ID
OPTIONAL, -- Need N
→ → → useWhiteCellList              BOOLEAN
→ → },
     . . .
  },
  rsType                           NR-RS-Type,
  reportInterval                       ReportInterval,
  reportAmount                         ENUMERATED {r1, r2, r4, r8, r16,
r32, r64, infinity},
  reportQuantityCell                   MeasReportQuantity,
  maxReportCells                       INTEGER (1..maxCellReport),
```

-continued

```
    reportQuantityRS-Indexes                MeasReportQuantity
OPTIONAL,    -- Need R
    maxNrofRS-IndexesToReport               INTEGER
(1..maxNrofIndexesToReport)                     OPTIONAL,    -- Need R
    includeBeamMeasurements                 BOOLEAN,
    reportAddNeighMeas                      ENUMERATED {setup}
OPTIONAL,    -- Need R
  . . .
}
```

In some other embodiments, the UE 120 is configured with a configuration similar to event B1, i.e. Inter-RAT Neighbour becomes better than absolute threshold, but unlike the legacy way of sending a measurement report when the conditions are fulfilled for an inter-RAT neighbour cell, the UE 120 will perform a conditional resume of an SCG. This may be used to resume an NR SCG, if the network node 110 is an NR master or an LTE SCG, if the network node 110 is an LTE master, as the B1 event is an intra-RAT event.

An example on how this may be realized is shown below where a new event is defined in reportConfigInterRAT, a similar approach may be taken in LTE.

```
eventBx                          SEQUENCE {
  bx-ThresholdEUTRA                     MeasTriggerQuantityEUTRA,
  hysteresis                            Hysteresis,
  timeToTrigger                         TimeToTrigger,
  . . .
→ → → scgToReSumeList            SEQUENCE (SIZE (1 . . . maxSCG) )
                                 OF SCG-ID
OPTIONAL, -- Need N
}
```

The scgToResumeList refers to the list of SCG configurations that are associated with the same triggering conditions. If different triggering conditions are to be configured for different SCG configurations, several Bx events may be configured. Since the events are associated with measurement objects that are referring to a certain frequency, if the different SCGs configurations are referring to different frequencies, i.e. the PSCells, then several Bx events will be required, even if the same triggering conditions, e.g. bx-Threshold, are to be configured.

A similar approach as the embodiment above may be taken where a new EventTriggerResumeConfigInterRAT may be used instead of the EventTriggerConfigInterRAT, as shown below:

```
EventTriggerResumeConfigInterRAT ::=       SEQUENCE {
  eventId                                  CHOICE {
    eventBx                                  SEQUENCE {
      b1-ThresholdEUTRA                        MeasTriggerQuantityEUTRA,
      hysteresis                               Hysteresis,
      timeToTrigger                            TimeToTrigger,
      . . .,
→ → → scgToReSumeList                SEQUENCE (SIZE (1 . . . maxSCG) )
                                     OF SCG-ID
OPTIONAL, -- Need N
    },
    . . .
  },
  rsType                             NS-RS-Type,
    reportInterval                           ReportInterval,
    reportAmount                     ENUMERATED {r1, r2, r4, r8, r16, r32, r64,
infinity},
    reportQuantity                   MeasReportQuantity,
    maxReportCells                           INTEGER (1..maxCellReport),
  . . .
}
```

In some of the embodiments above, when the conditions of the event Ax or Bx are fulfilled, then the UE 120 will act as if it has received an RRCResume message or RRCReconfiguration message from the network node 110, such as an MN, that triggered the resume and performs the SCG resume procedure.

Signaling for SCG/SCell Resume

In some embodiments, the configuration provided to the UE 120 may comprise an RRCReconfiguration with a ReconfigurationWithSync associated to the cell group to be added, or equivalent, associated with a triggering condition configuration, which may comprise an Ax event configuration, like A4 event. Upon the reception of that configuration the UE 120 starts to perform associated measurements according to the provided triggering configurations. When at least one triggering condition is fulfilled the UE 120 applies the RRCReconfiguration with ReconfigurationWithSync message and performs SCG and/or SCell addition.

In some embodiments, the conditional SCG and/or SCell addition configuration may be provided while the UE 120 is in RRC_CONNECTED. That may e.g. be done in an RRCReconfiguration message comprising a list of Conditional configurations comprising per cell, an RRCReconfiguration and a triggering condition, or with a new message e.g. referred to as RRCConditionalReconfiguration. Upon reception, of the message the UE 120 starts to monitor the triggering conditions and when a condition is fulfilled the UE 120 applies the associated RRCReconfiguration that may have been stored, and actions upon such as security establishment, random access, etc.

In some embodiments, the SCG resume conditions configured may be kept when the UE 120 transits from RRC_CONNECTED state to RRC_INACTIVE state.

In some of the embodiments where the UE 120 is in INACTIVE state, the UE 120 may benefit from configured conditions to decide whether an RRC Resume Request message (to PCell) should include any request for a specific SCG/SCell. Therefore, instead of having the choice by the UE 120, of which SCG/SCell to indicate on a resume request, this choice is made according to network configured conditions.

In some of the embodiments, when the conditional resume is triggered, the UE 120 may initiate e.g. a contention-free random-access procedure towards a target network node e.g. a target SN which may infer it is a resume request since it has a suspended configuration for this UE 120. The candidate SN may provide configurations for the UE 120 to perform contention-free random-access which will uniquely identify the UE 120. This configuration may be provided via the network node 110 e.g. an MN.

In some other embodiments, when the conditional resume is triggered, random access is not inferred as resume request, instead the UE 120 initiates partial RRC Resume Request e.g. towards PSCell, after random access.

In some embodiments, the target network node such as an SN may inform the network node 110 e.g. the MN about the UE 120 resumption request or random-access procedure. Thus, the network node 110 e.g. the MN may either reject the UE 120 resumption of the SCG, e.g. in case the network decides upon handover of the UE 120 to another RAT, or acknowledge it. If desired to have only one active SCG at a time, the network node 110 e.g. the MN may also release or suspend the source network node such as the SN configuration resumed, if any.

In some embodiments, the UE 120 sends an RRC message, e.g. a new RRC message, towards the network node 110 e.g. the MN indicating that it has resumed a particular SCG configuration. The indication may include the SCG-Identity (ID) and optionally the measurement results that triggered the resumption.

Figure 10A:
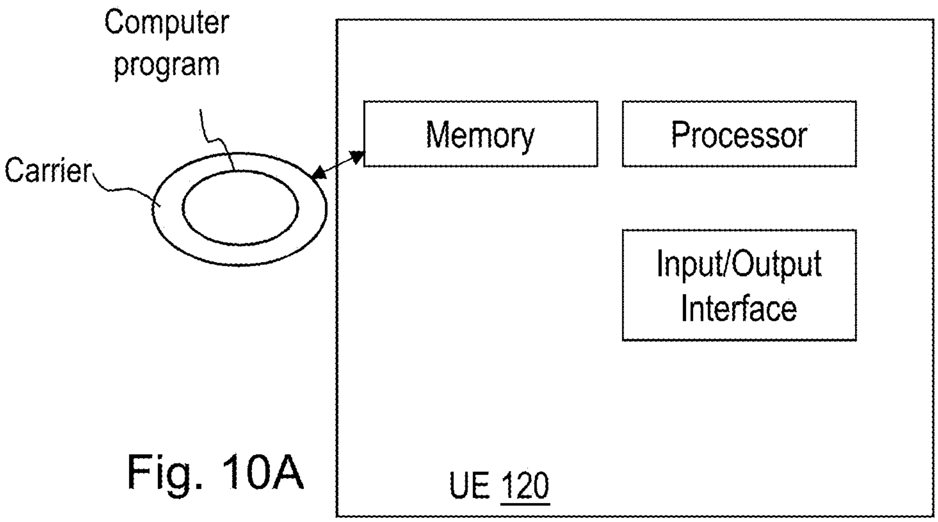
FIG. 10A and FIG. 10B are schematic block diagrams depicting embodiments of a UE.
Figure 10B:
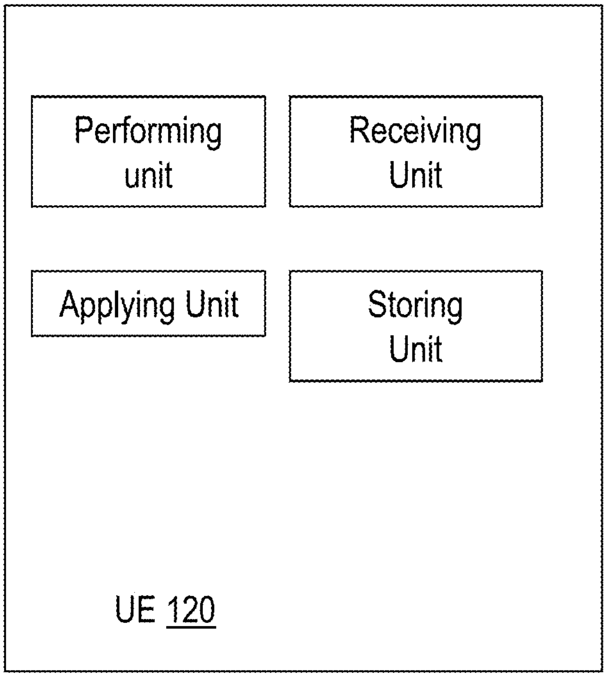

FIG. 10A and FIG. 10B show an example of the UE 120 comprising a performing unit, a receiving unit, an applying unit and a storing unit see FIG. 10B. These may be used to perform the method action 801-804.

Figure 11A:
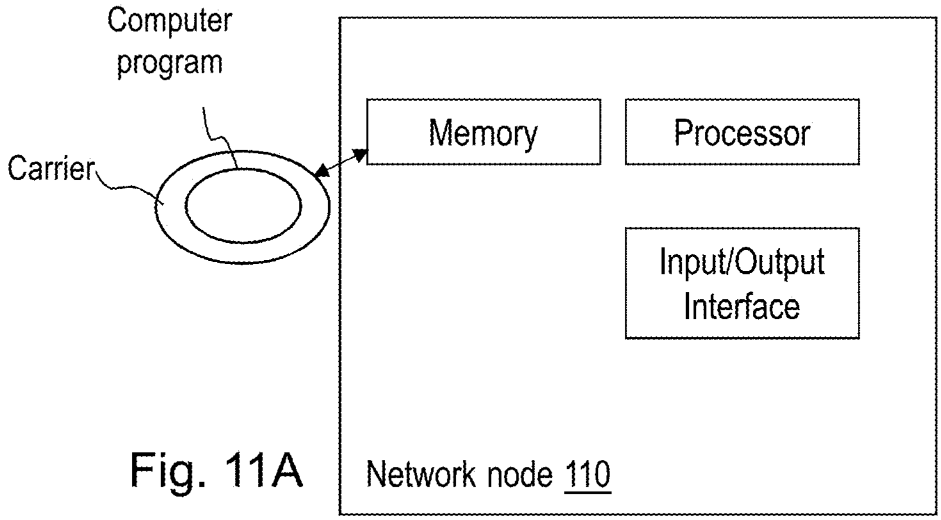
FIG. 11A and FIG. 11B are schematic block diagrams depicting embodiments of a network node.
Figure 11B:
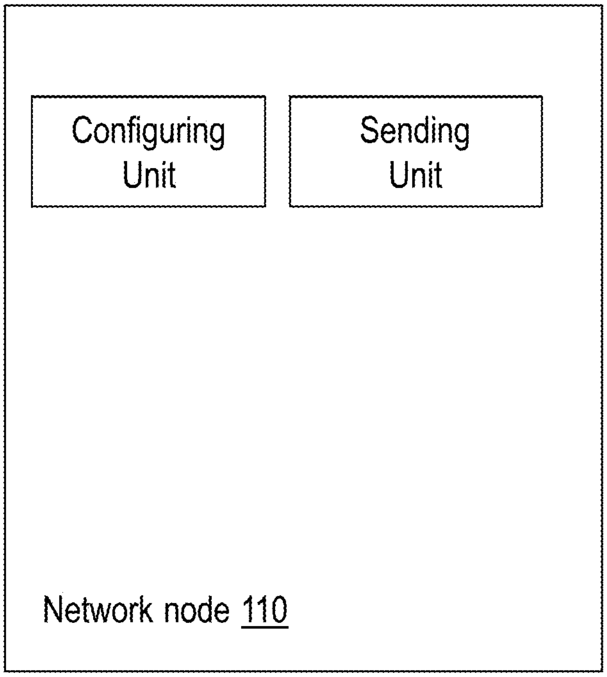

FIG. 11A and FIG. 11B show an example of the network node 110 comprising a sending unit and a configuring unit see FIG. 11B. These may be used to perform the method action 901-902.

The UE 120 and the network node 110 may comprise a respective input and output interface configured to communicate with each other, see FIG. 10A and FIG. 11A. The input and output interface may comprise a wireless receiver (not shown) and a wireless transmitter (not shown).

The embodiments herein may be implemented through a respective processor or one or more processors, such as the processor of a processing circuitry in the UE 120 depicted in FIG. 10A and in the network node 110 depicted in FIG. 11A, together with computer program code for performing the functions and actions of the embodiments herein. The program code mentioned above may also be provided as a computer program product, for instance in the form of a data carrier carrying computer program code for performing the embodiments herein when being loaded into the respective UE 120 and the network node 110. One such carrier may be in the form of a CD ROM disc. It is however feasible with other data carriers such as a memory stick. The computer program code may furthermore be provided as pure program code on a server and downloaded to the the respective UE 120 and the network node 110.

The UE 120 and the network node 110 may further comprise a respective memory comprising one or more memory units. The respective memory comprises instructions executable by the respective processor in the respective UE 120 and the network node 110.

The memory is arranged to be used to store e.g. indications, UE capabilities associated with respective UE capability IDs, SCG configurations, information, data, other configurations, and applications to perform the methods herein when being executed in the respective UE 120 and the network node 110.

In some embodiments, a respective computer program comprises instructions, which when executed by the at least one processor, cause the at least one processor of the respective UE 120 and the network node 110 to perform the respective actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Some example Embodiments numbered 1-24 are described below. The following embodiments e.g. refer to FIG. 7-9 and FIG. 10A, FIG. 10B, FIG. 11A, and FIG. 11B.

Embodiment 1. A method performed by a User Equipment, UE, 120 for handling a Secondary Cell Group, SCG, configuration in a wireless communications network 100, the method comprising:

receiving 801 from a network node 110, an SCG configuration and a trigger condition related to the signal quality of a cell associated with the SCG configuration, performing 803 signal quality measurements of a cell associated with the SCG configuration, when the trigger condition of the cell is fulfilled according to the received SCG configuration, applying 804 the SCG configuration associated to the cell fulfilling the trigger condition.

Embodiment 2. The method according to embodiment 1, further comprising:

storing 802 the SCG configuration and the trigger condition related to the signal quality of a cell associated with the SCG configuration.

Embodiment 3. The method according to any of the embodiments 1-2, wherein the trigger condition comprises an event condition, such as similar to event A4 Neighbour becomes better than absolute threshold, a Bx event, or a B1 event or any other triggering condition equivalent to an Ax event.

Embodiment 4. The method according to any of the embodiments 1-3, wherein the received SCG configuration comprises a Radio Resource Control, RRC, reconfiguration with a Reconfiguration With Synchronization associated with the SCG configuration to be applied associated with the trigger condition to be fulfilled.

Embodiment 5. The method according to any of the embodiments 1-3, wherein the received SCG configuration comprises a UE Access Stratum, AS, context identity and information about one or more potential, SCG configurations e.g. in a list of SCG or SCells, to apply.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A method performed by a network node 110 for handling a Secondary Cell Group, SCG, configuration in a wireless communications network 100, the method comprising:

sending 901 to a User Equipment, UE, 120, an SCG configuration and a trigger condition related to the signal quality of a cell associated with the SCG configuration, and configuring 902 the UE 120 to:

perform signal quality measurements of a cell associated with the SCG configuration, and when the trigger condition of the cell is fulfilled according to the received SCG configuration, apply the SCG configuration associated to the cell fulfilling the trigger condition.

Embodiment 9. The method according to embodiment 8, configuring 902 the UE 120 further comprises configuring the UE 120 to:

store the SCG configuration and the trigger condition related to the signal quality of a cell associated with the SCG configuration.

Embodiment 10. The method according to any of the embodiments 8-9, wherein the trigger condition comprises an event condition, such as e.g. similar to event A4 Neighbour becomes better than absolute threshold, a Bx event, or a B1 event or any other triggering condition equivalent to an Ax event.

Embodiment 11. The method according to any of the embodiments 8-10, wherein the sent SCG configuration comprises a Radio Resource Control, RRC, reconfiguration with a Reconfiguration With Synchronization associated with the SCG configuration to be applied associated with the trigger condition to be fulfilled.

Embodiment 12. The method according to any of the embodiments 8-10, wherein the sent SCG configuration comprises a UE Access Stratum, AS, context identity and information about one or more potential, SCG configurations e.g. in a list of SCG or SCells, to apply.

Embodiment 13. A computer program comprising instructions, which when executed by a processor, causes the processor to perform actions according to any of the embodiments 8-12.

Embodiment 14. A carrier comprising the computer program of embodiment 13, wherein the carrier is one of an electronic signal, an optical signal, an electromagnetic signal, a magnetic signal, an electric signal, a radio signal, a microwave signal, or a computer-readable storage medium.

Embodiment 15. A User Equipment, UE, 120 configured to handle a Secondary Cell Group, SCG, configuration in a wireless communications network 100, the UE 120 further being configured to:

receive from a network node 110, an SCG configuration and a trigger condition related to the signal quality of a cell associated with the SCG configuration, e.g. by means of a receiving unit in the UE 120, perform signal quality measurements of a cell associated with the SCG configuration, e.g. by means of a performing unit in the UE 120, and when the trigger condition of the cell is fulfilled according to the received SCG configuration, apply the SCG configuration associated to the cell fulfilling the trigger condition, e.g. by means of an applying unit in the UE 120.

Embodiment 16. The UE 120 according to embodiment 15, further being configured to:

store the SCG configuration and the trigger condition related to the signal quality of a cell associated with the SCG configuration, e.g. by means of a storing unit in the UE 120.

Embodiment 17. The UE according to any of the embodiments 15-16, wherein the trigger condition is adapted to comprise an event condition, such as similar to event A4 Neighbour becomes better than absolute threshold, a Bx event, or a B1 event or any other triggering condition equivalent to an Ax event.

Embodiment 18. The UE according to any of the embodiments 15-17, wherein the received SCG configuration is adapted to comprise a Radio Resource Control, RRC, reconfiguration with a Reconfiguration With Synchronization associated with the SCG configuration to be applied associated with the trigger condition to be fulfilled.

Embodiment 19. The UE according to any of the embodiments 15-17, wherein the received SCG configuration comprises a UE Access Stratum, AS, context identity and information about one or more potential, SCG configurations e.g. in a list of SCG or SCells, to apply.

Embodiment 20. A network node 110 configured to handle a Secondary Cell Group, SCG, configuration in a wireless communications network 100, the network node further being configured to:

send to a User Equipment, UE, 120, an SCG configuration and a trigger condition related to the signal quality of a cell associated with the SCG configuration, e.g. by means of a sending unit in the network node 110, and e.g. by means of a configuring unit in the network node 110, configure the UE 120 to:

perform signal quality measurements of a cell associated with the SCG configuration, and when the trigger condition of the cell is fulfilled according to the received SCG configuration, apply the SCG configuration associated to the cell fulfilling the trigger condition.

Embodiment 21. The network node 110 according to embodiment 20, further being configured to configure the UE 120 to:-store the SCG configuration and the trigger condition related to the signal quality of a cell associated with the SCG configuration, e.g. by means of the configuring unit in the network node 110.

Embodiment 22. The network node 110 according to any of the embodiments 20-21, wherein the trigger condition is configured to comprise an event condition such as e.g. similar to event A4 Neighbour becomes better than absolute threshold, a Bx event, or a B1 event or any other triggering condition equivalent to an Ax event.

Embodiment 23. The network node 110 according to any of the embodiments 20-22, wherein the sent SCG configuration is configured to comprise a Radio Resource Control, RRC, reconfiguration with a Reconfiguration With Synchronization associated with the SCG configuration to be applied associated with the trigger condition to be fulfilled.

Embodiment 24. The network node 110 according to any of the embodiments 20-22, wherein the sent SCG configuration is configured to comprise a UE Access Stratum, AS, context identity and information about one or more potential, SCG configurations e.g. in a list of SCG or SCells, to apply.

Figure 12:
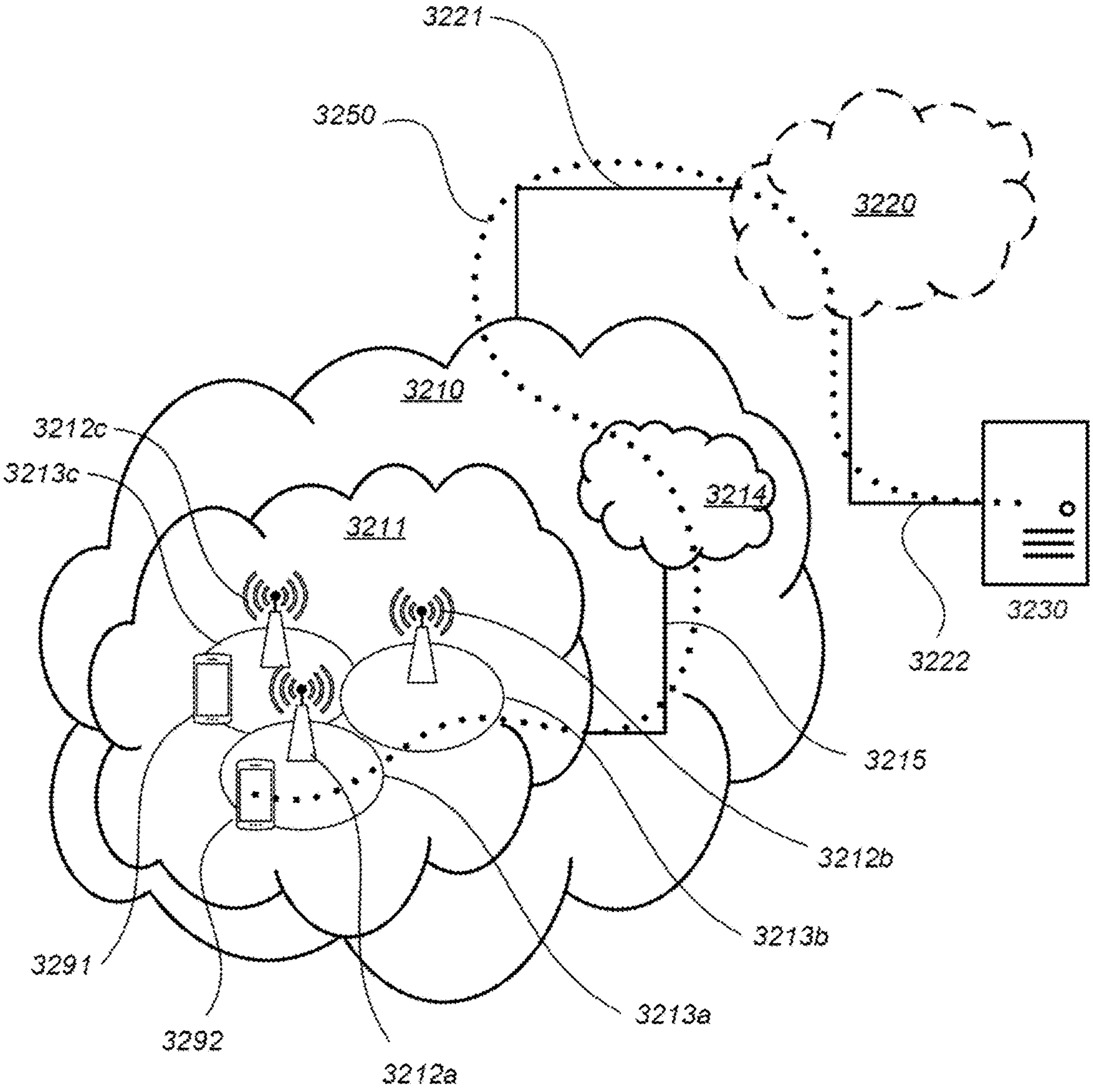
FIG. 12 schematically illustrates a telecommunication network connected via an intermediate network to a host computer.

With reference to FIG. 12, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as the network node 110, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as the UE 120, a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 12 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 13. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 13) served by the base station 3320. The communication interface 3326 may be configured to facilitate a connection 3360 to the host computer 3310. The connection 3360 may be direct or it may pass through a core network (not shown in FIG. 13) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 13:
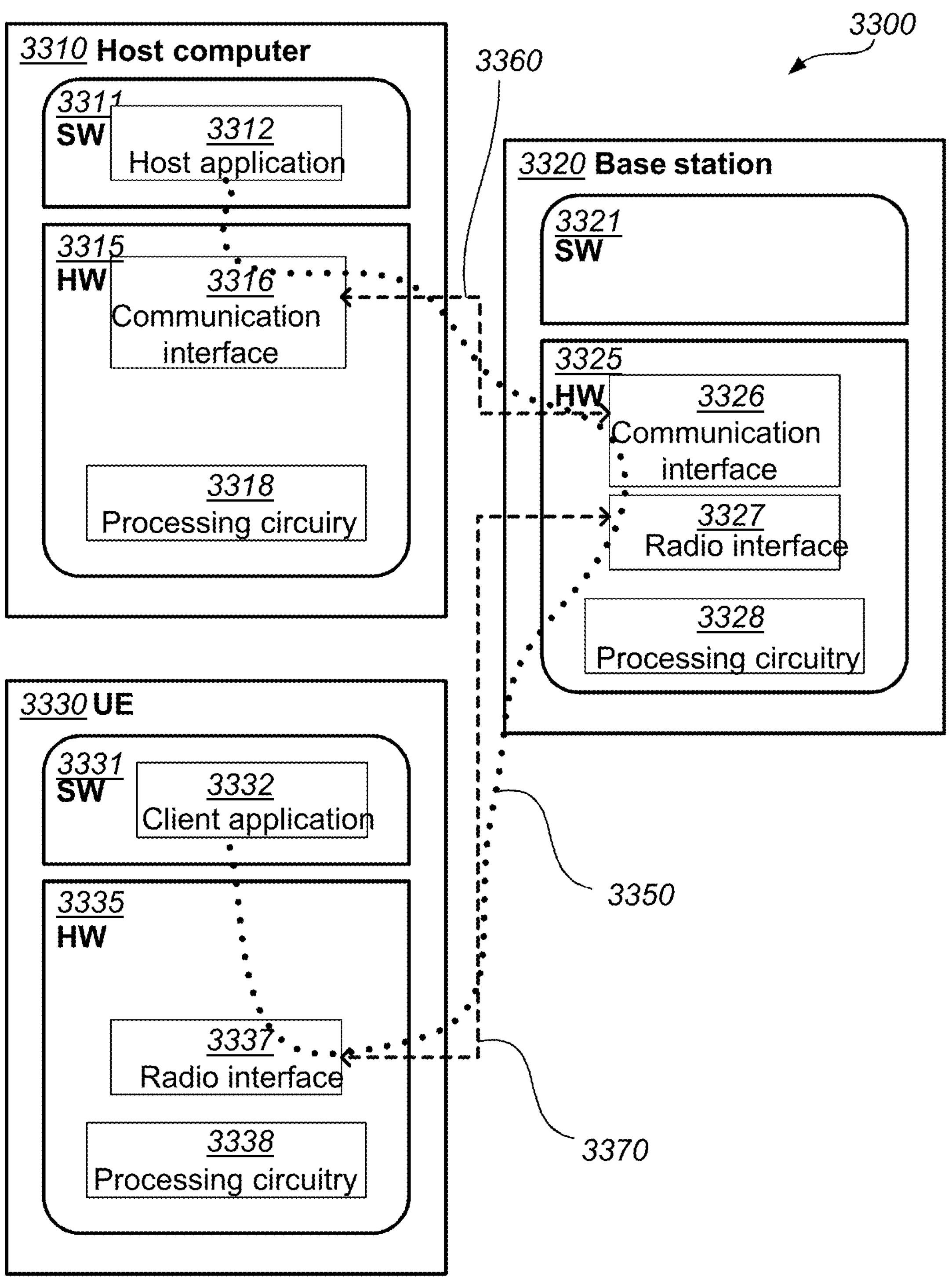
FIG. 13 is a generalized block diagram of a host computer communicating via a base station with a user equipment over a partially wireless connection.

It is noted that the host computer 3310, base station 3320 and UE 3330 illustrated in FIG. 13 may be identical to the host computer 3230, one of the base stations 3212*a*, 3212*b*, 3212*c* and one of the UEs 3291, 3292 of FIG. 12, respectively. This is to say, the inner workings of these entities may be as shown in FIG. 13 and independently, the surrounding network topology may be that of FIG. 12.

In FIG. 13, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 14:
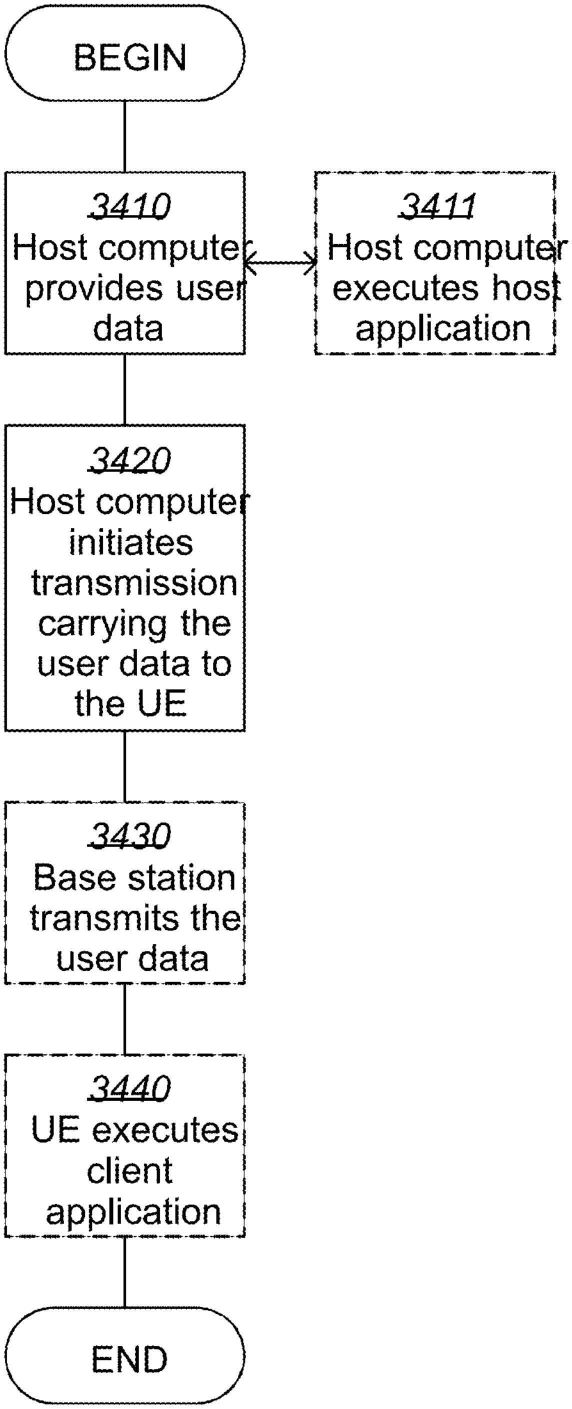
FIGS. 14-17 are flowcharts illustrating methods implemented in a communication system including a host computer, a base station and a user equipment.

FIG. 14 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 14 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 15:
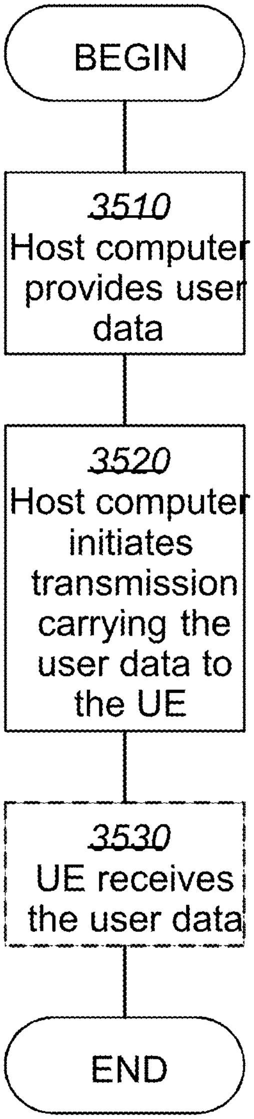

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 15 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 16:
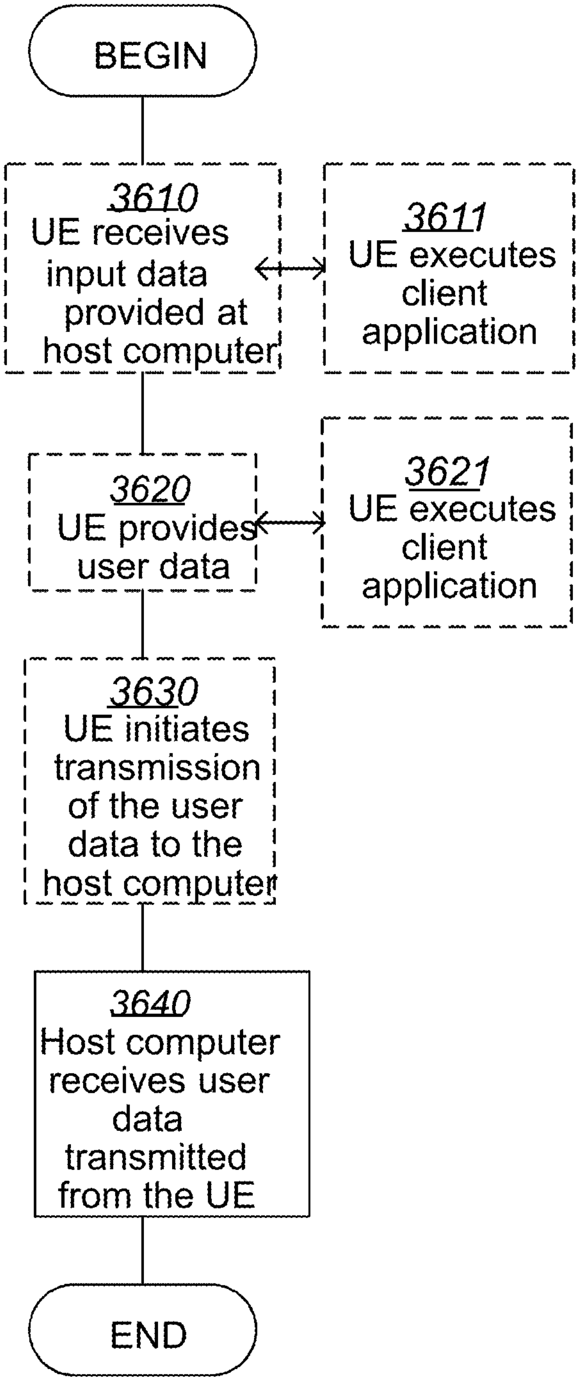

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 16 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 17:
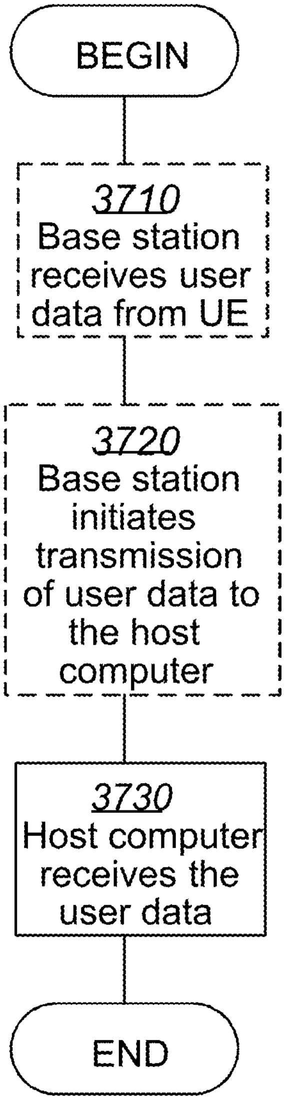

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 12 and FIG. 13. For simplicity of the present disclosure, only drawing references to FIG. 17 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

ABBREVIATION EXPLANATION

CA Carrier Aggregation
DC Dual Connectivity
EN-DC E-UTRA NR Dual Connectivity
eNB LTE Base Station (evolved Node B)
gNB NR Base Station
LTE Long Term Evolution
MCG Master Cell Group
MN Master Node
MR-DC Multi-Radio Dual Connectivity
NR New Radio
PCell Primary Cell
PSCell Primary Cell of the SCG
RAT Radio Access Technology
RRC Radio Resource Control
SCG Secondary Cell Group
SCell Secondary Cell
SN Secondary Node
UE User Equipment When using the word "comprise" or "comprising" it shall be interpreted as non-limiting, i.e. meaning "consist at least of".

The embodiments herein are not limited to the above described preferred embodiments. Various alternatives, modifications and equivalents may be used.

What is claimed is:

1. A method performed by a User Equipment (UE) for handling a Secondary Cell Group (SCG) configuration in a wireless communications network, the method comprising:
receiving, from a network node, a list of conditional SCG configurations wherein each conditional SCG configuration comprises a trigger condition based on signal quality measurements and one SCG configuration, wherein the trigger condition is to trigger application of the SCG configuration;
initiating monitoring of the trigger conditions for cells associated with the SCG configurations; and,
responsive to a trigger condition being fulfilled for a cell according to the received SCG configurations, applying the SCG configuration associated to the cell fulfilling the trigger condition;
wherein upon reception of the list of SCG configurations the UE starts to perform associated measurements according to the provided triggering conditions.

2. The method of claim 1, further comprising:
storing the SCG configuration and the trigger condition related to the signal quality of a cell associated with the SCG configuration.

3. The method of claim 1, wherein the trigger condition comprises an event condition.

4. The method of claim 1, wherein the trigger condition comprises an event condition that is fulfilled when a neighbour cell becomes better than an absolute threshold.

5. The method of claim 1, wherein said receiving comprises receiving a Radio Resource Control (RRC) reconfiguration with a Reconfiguration With Synchronization associated with the SCG configuration to be applied associated with the trigger condition to be fulfilled.

6. The method of claim 1, wherein said receiving comprises receiving a UE Access Stratum (AS) context identity and information about one or more potential SCG configurations to apply.

7. A method performed by a network node for handling a Secondary Cell Group (SCG) configuration in a wireless communications network, the method comprising:
sending, to a User Equipment (UE), a list of conditional SCG configurations wherein each conditional SCG configuration comprises a trigger condition based on signal quality measurements and one SCG configuration, wherein the trigger condition is to trigger application of the SCG configuration; and
configuring the UE to:
perform signal quality measurements of cells associated with the SCG configurations, and
when a trigger condition is fulfilled for a cell according to the received conditional SCG configurations, apply the SCG configuration associated to the cell fulfilling the trigger condition.

8. The method of claim 7, wherein configuring the UE further comprises configuring the UE to:
store the SCG configuration and the trigger condition related to the signal quality of a cell associated with the SCG configuration.

9. The method of claim 7, wherein the trigger condition comprises an event condition.

10. The method of claim 7, wherein the trigger condition comprises an event condition that is fulfilled when a neighbour cell becomes better than an absolute threshold.

11. The method of claim 7, wherein said sending comprises sending a Radio Resource Control (RRC) reconfiguration with a Reconfiguration With Synchronization associated with the SCG configuration to be applied associated with the trigger condition to be fulfilled.

12. The method of claim 7, wherein said sending comprises sending a UE Access Stratum (AS) context identity and information about one or more potential SCG configurations to apply.

13. A User Equipment (UE) configured to handle a Secondary Cell Group (SCG) configuration in a wireless communications network, the UE further being configured to:

receive, from a network node, a list of conditional SCG configurations wherein each conditional SCG configuration comprises a trigger condition based on signal quality measurements and one SCG configuration, wherein the trigger condition is to trigger application of the SCG configuration;

initiate monitoring of the trigger conditions for cells associated with the SCG configurations; and, responsive to a trigger condition being fulfilled for a cell according to the received SCG configurations, apply the SCG configuration associated to the cell fulfilling the trigger condition;

wherein upon reception of the list of SCG configurations the UE starts to perform associated measurements according to the provided triggering conditions.

14. The UE of claim 13, further being configured to:

store the SCG configuration and the trigger condition related to the signal quality of a cell associated with the SCG configuration.

15. The UE of claim 13, wherein the trigger condition comprises an event condition.

16. The UE of claim 13, wherein the trigger condition comprises an event condition that is fulfilled when a neighbour cell becomes better than an absolute threshold.

17. The method of claim 1, wherein said receiving comprises receiving a Radio Resource Control (RRC) reconfiguration with a Reconfiguration With Synchronization associated with the SCG configuration to be applied associated with the trigger condition to be fulfilled.

18. The method of claim 1, wherein said receiving comprises receiving a UE Access Stratum (AS) context identity and information about one or more potential SCG configurations.

19. A network node configured to handle a Secondary Cell Group (SCG) configuration in a wireless communications network, the network node further being configured to:

send, to a User Equipment (UE), a list of conditional SCG configurations wherein each conditional SCG configuration comprises a trigger condition based on signal quality measurements and one SCG configuration, wherein the trigger condition is to trigger application of the SCG configuration; and configure the UE to:

perform signal quality measurements of cells associated with the SCG configurations, and when a trigger condition is fulfilled for a cell according to the received conditional SCG configurations, apply the SCG configuration associated to the cell fulfilling the trigger condition.

20. The network node of claim 19, further being configured to configure the UE to:

store the SCG configuration and the trigger condition related to the signal quality of a cell associated with the SCG configuration.

* * * * *